US012600322B2

(12) United States Patent
Inoue et al.

(10) Patent No.: US 12,600,322 B2
(45) Date of Patent: Apr. 14, 2026

(54) CLEANER SYSTEM

(71) Applicant: KOITO MANUFACTURING CO., LTD., Tokyo (JP)

(72) Inventors: Tatsuya Inoue, Shizuoka (JP); Shota Yonemaru, Shizuoka (JP); Kazuhiro Suzuki, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 199 days.

(21) Appl. No.: 18/703,552

(22) PCT Filed: Oct. 5, 2022

(86) PCT No.: PCT/JP2022/037279
§ 371 (c)(1),
(2) Date: Apr. 22, 2024

(87) PCT Pub. No.: WO2023/068050
PCT Pub. Date: Apr. 27, 2023

(65) Prior Publication Data
US 2025/0236268 A1     Jul. 24, 2025

(30) Foreign Application Priority Data

Oct. 20, 2021   (JP) ................................. 2021-171529
Oct. 20, 2021   (JP) ................................. 2021-171530
Oct. 20, 2021   (JP) ................................. 2021-171532

(51) Int. Cl.
*B60S 1/56*          (2006.01)
*B60S 1/48*          (2006.01)
*B60S 1/52*          (2006.01)

(52) U.S. Cl.
CPC ................. *B60S 1/56* (2013.01); *B60S 1/486* (2013.01); *B60S 1/526* (2013.01)

(58) Field of Classification Search
CPC ...................................................... B60S 1/56
See application file for complete search history.

(56) References Cited

U.S. PATENT DOCUMENTS

2020/0108801 A1     4/2020   Frederick et al.
2020/0180567 A1     6/2020   Sakai et al.

FOREIGN PATENT DOCUMENTS

DE            2600379 A1      7/1977
DE       102010013974 A1     10/2011
DE       102011115207 A1      4/2012
(Continued)

OTHER PUBLICATIONS

The partial supplementary European search report issued in corresponding European Patent Application No. 22883355.4, mailed on Jan. 7, 2025 (11 pages).
(Continued)

*Primary Examiner* — Jason Y Ko
(74) *Attorney, Agent, or Firm* — Osha Bergman Watanabe & Burton LLP

(57)              ABSTRACT

A cleaner system includes a cleaner including a nozzle having a jetting port for jetting a cleaning medium to a surface to be cleaned of a sensor mounted on a vehicle, and a control unit configured to control an operation of the cleaner. The nozzle is rotatable or slidingly movable in an operation state of the cleaner. The control unit is configured to change a movable range of the nozzle according to a travelling condition of the vehicle.

13 Claims, 13 Drawing Sheets

(56)             References Cited

FOREIGN PATENT DOCUMENTS

| | | | |
|---|---|---|---|
| JP | 2016-187990 | A | 11/2016 |
| WO | 2018-230255 | A1 | 12/2018 |

OTHER PUBLICATIONS

International Search Report in corresponding International Application No. PCT/JP2022/037279, dated Dec. 27, 2022 (5 pages).
Written Opinion in corresponding International Application No. PCT/JP2022/037279, dated Dec. 27, 2022 (4 pages).

CLEANER SYSTEM

TECHNICAL FIELD

The present disclosure relates to a cleaner system.

BACKGROUND ART

A headlamp cleaner for a vehicle is known in JP2016-187990A and the like.

SUMMARY OF INVENTION

In recent years, development of vehicles capable of autonomous driving has been attempted. In order to realize the autonomous driving, for example, it is required to maintain good sensitivity of various sensors such as LiDAR. There is a demand for a sensor cleaner for cleaning a sensor to remove foreign matter adhering to the sensor.

Depending on a weather condition, the type and the degree of dirt adhering to an in-vehicle sensor change.

An object of the present disclosure is to provide a cleaner system including a cleaner capable of effectively cleaning a sensor according to a travelling situation of a vehicle.

Another object of the present disclosure is to provide a cleaner system including a cleaner capable of effectively cleaning a sensor and maintaining detection accuracy of the sensor according to a surrounding environment.

An object of the present disclosure is to provide a cleaner system including a cleaner capable of effectively cleaning a sensor using a movable nozzle and maintaining detection accuracy of the sensor according to a weather condition when a vehicle is travelling.

In order to achieve at least one of the above objects, a cleaner system according to one aspect of the present disclosure includes:

a cleaner including a nozzle having a jetting port for jetting a cleaning medium to a surface to be cleaned of a sensor mounted on a vehicle; and a control unit configured to control an operation of the cleaner, in which the nozzle is rotatable or slidingly movable in an operation state of the cleaner, and the control unit is configured to change a movable range of the nozzle according to a travelling condition of the vehicle.

In order to achieve at least one of the above objects, a cleaner system according to one aspect of the present disclosure includes:

a cleaner including a nozzle having a jetting port for jetting a cleaning medium to a surface to be cleaned of a sensor capable of detecting an object; and a control unit configured to control an operation of the cleaner, in which the nozzle is rotatable or slidingly movable in an operation state of the cleaner, and the control unit controls a movement of the nozzle so as to clean an area corresponding to the object on the surface to be cleaned in a predetermined mode different from a normal mode.

In order to achieve at least one of the above objects, a cleaner system according to one aspect of the present disclosure includes:

a cleaner including a nozzle having a jetting port for jetting a cleaning medium to a surface to be cleaned of a sensor mounted on a vehicle; and a control unit configured to control an operation of the cleaner, in which the nozzle is rotatable or slidingly movable in an operation state of the cleaner, and the control unit is configured to acquire weather information from an external element different from the sensor and the cleaner and change an operation mode of the nozzle according to the weather information.

According to the present disclosure, it is possible to provide the cleaner system including the cleaner capable of effectively cleaning the sensor according to a travelling situation of the vehicle.

According to the present disclosure, it is possible to provide the cleaner system including the cleaner capable of effectively cleaning the sensor and maintaining detection accuracy of the sensor according to a surrounding environment.

According to the present disclosure, it is possible to provide the cleaner system including the cleaner capable of effectively cleaning the sensor using the movable nozzle and maintaining detection accuracy of the sensor according to a weather condition when the vehicle is travelling.

DESCRIPTION OF EMBODIMENTS

Figure 1:
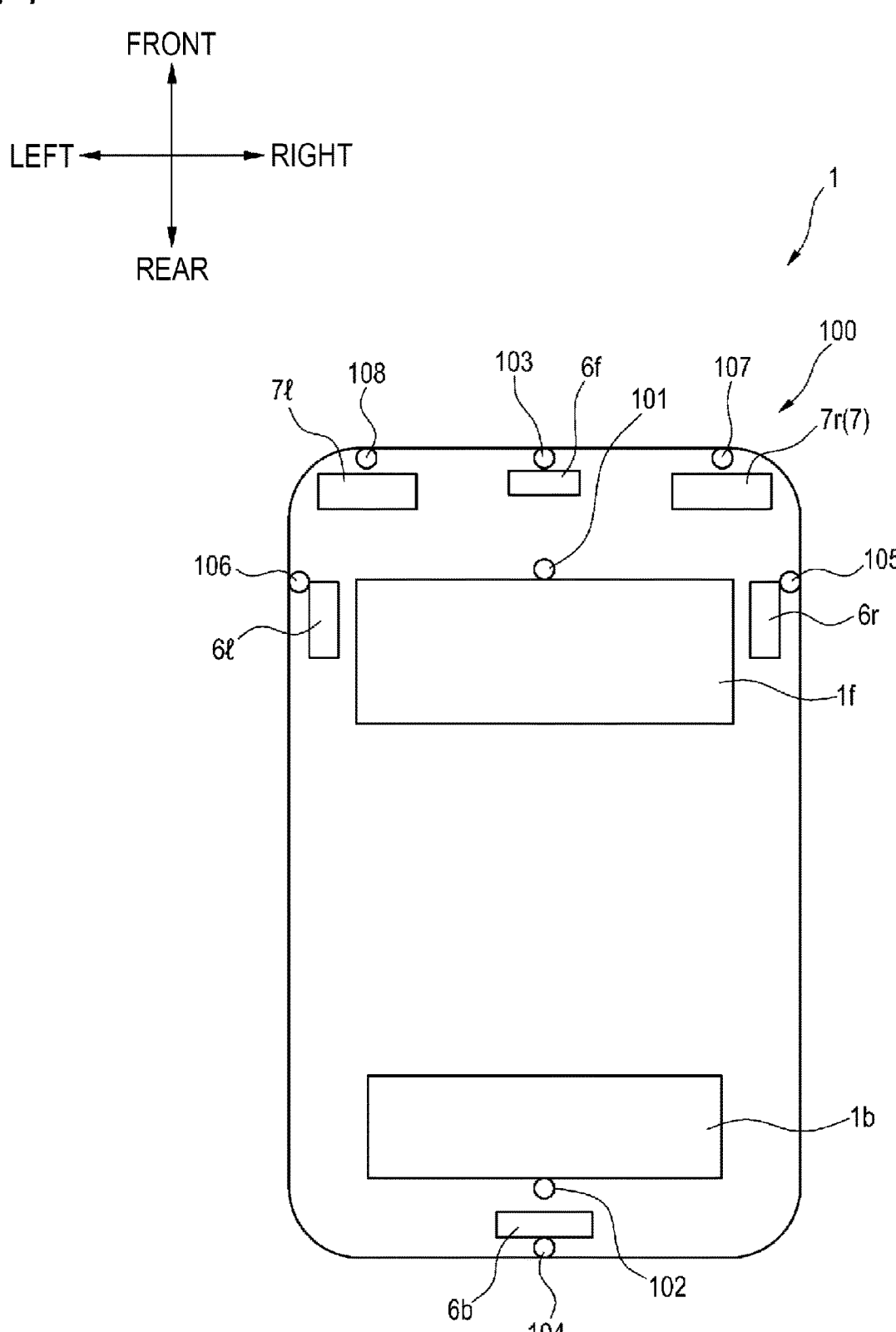
FIG. 1 is a top view of a vehicle on which a sensor system according to an embodiment of the present disclosure is mounted.

Hereinafter, embodiments of the present disclosure will be described with reference to the drawings. Members having the same reference numerals as those already described in the description of the embodiments will not be described for convenience of description. Further, for convenience of description, dimensions of each member illustrated in the drawings may be different from actual dimensions of each member.

In the description of the embodiments of the present disclosure (hereinafter, referred to as the present embodiment), for convenience of description, a "left-right direction", a "front-rear direction", and an "upper-lower direction" will be appropriately referred to. The directions are relative directions set for a vehicle 1 illustrated in FIG. 1. Here, the "upper-lower direction" is a direction including an "upper direction" and a "lower direction". The "front-rear direction" is a direction including a "front direction" and a "rear direction". The "left-right direction" is a direction including a "left direction" and a "right direction".

FIG. 1 is a top view of the vehicle 1 on which a sensor system 100 according to the present embodiment is mounted. The vehicle 1 is an automobile capable of travelling in an autonomous driving mode in which a travelling control of the vehicle is autonomously performed. The vehicle 1 includes the sensor system 100 for cleaning an object to be cleaned (for example, an in-vehicle sensor, various lamps, a window shield, or the like) provided outside a vehicle compartment.

Figure 2:
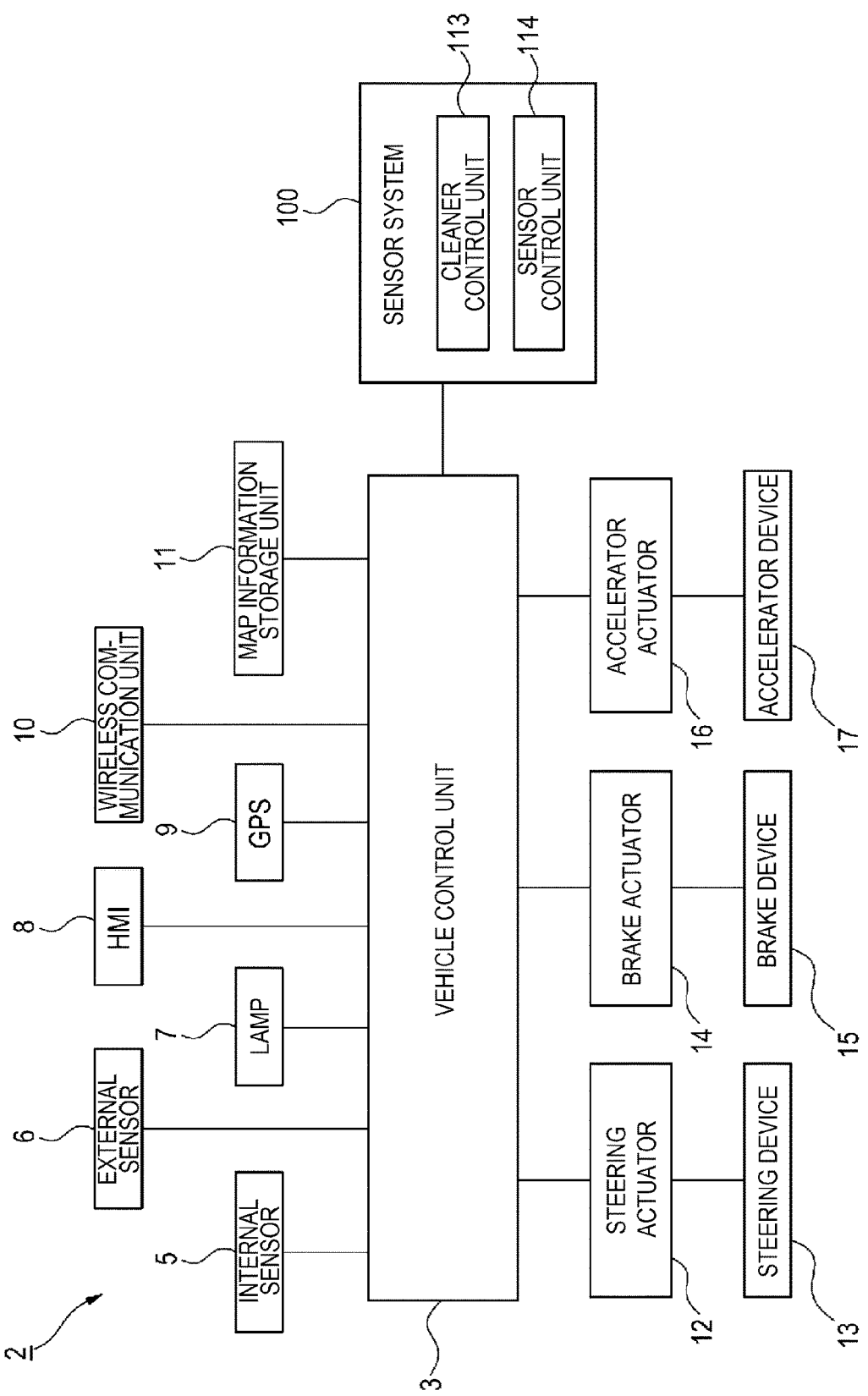
FIG. 2 is a block diagram of a vehicle system in which the sensor system of FIG. 1 is incorporated.

FIG. 2 is a block diagram of a vehicle system 2 in which the sensor system 100 is incorporated. First, the vehicle system 2 of the vehicle 1 will be described with reference to FIG. 2. As illustrated in FIG. 2, the vehicle system 2 includes a vehicle control unit 3, an internal sensor 5, an external sensor 6, a lamp 7, a human machine interface (HMI) 8, a global positioning system (GPS) 9, a wireless communication unit 10, and a map information storage unit 11. The vehicle system 2 further includes a steering actuator 12, a steering device 13, a brake actuator 14, a brake device 15, an accelerator actuator 16, and an accelerator device 17. The sensor system 100 including a cleaner control unit 113 and a sensor control unit 114 is communicably connected to the vehicle control unit 3 of the vehicle system 2.

The vehicle control unit 3 includes an electronic control unit (ECU). The vehicle control unit 3 includes a processor such as a central processing unit (CPU), a read only memory (ROM) in which various vehicle control programs are stored, and a random access memory (RAM) in which various vehicle control data are temporarily stored. The processor is configured to load a program designated from various vehicle control programs stored in the ROM on the RAM and execute various processes in cooperation with the RAM. The vehicle control unit 3 is configured to control travelling of the vehicle 1.

The internal sensor 5 is a sensor capable of acquiring information on a host vehicle. The internal sensor 5 is, for example, at least one of an acceleration sensor, a speed sensor, a wheel speed sensor, and a gyro sensor. The internal sensor 5 is configured to acquire the information on the host vehicle including a travelling state of the vehicle 1 and output the information to the vehicle control unit 3 and the cleaner control unit 113. The internal sensor 5 may include a seating sensor that detects whether a driver is sitting in a driver's seat, a face orientation sensor that detects an orientation of a face of the driver, a human sensor that detects whether there is a person in the vehicle, and the like.

The external sensor 6 is a sensor capable of acquiring information on the outside of the host vehicle. The external sensor is, for example, at least one of a camera, a radar, and a LiDAR. The external sensor 6 is configured to acquire information on the outside of the host vehicle including the surrounding environment (other vehicles, pedestrians, road shapes, traffic signs, obstacles, and the like) of the vehicle 1 and output the information to the vehicle control unit 3, the cleaner control unit 113, and the sensor control unit 114. Alternatively, the external sensor 6 may include a weather sensor that detects a weather condition, an illuminance sensor that detects illuminance of the surrounding environment of the vehicle 1, or the like. Alternatively, the external sensor 6 may be a raindrop sensor that detects an amount of raindrops around the vehicle, a temperature sensor that detects an outside air temperature, a humidity sensor that detects a humidity around the vehicle, a dirt sensor that can detect an adhesion degree of dirt to a surface to be cleaned, or the like. For example, the camera is a camera including an imaging element such as a charge-coupled device (CCD) or a complementary MOS (CMOS). The camera is a camera that detects visible light or an infrared camera that detects an infrared ray. The radar is a millimeter wave radar, a microwave radar, a laser radar, or the like. LiDAR is an abbreviation of light detection and ranging or laser imaging detection and ranging. The LiDAR is a sensor that generally emits invisible light in front of the LiDAR and acquires information such as a distance to an object, a direction of the object, a shape of the object, and a material of the object based on the emitted light and returned light.

The lamp 7 is at least one of a headlamp or a position lamp provided at a front portion of the vehicle 1, a rear combination lamp provided at a rear portion of the vehicle 1, a turn signal lamp provided at a front portion or a side portion of the vehicle, and various lamps for notifying a driver of a pedestrian or another vehicle of a situation of the host vehicle.

The HMI 8 includes an input unit that receives an input operation from the driver and an output unit that outputs travelling information and the like to the driver. The input unit includes a steering wheel, an accelerator pedal, a brake pedal, a driving mode changeover switch for changing a driving mode of the vehicle 1, and the like. The output unit is a display that displays various travelling information.

The GPS 9 is configured to acquire current position information on the vehicle 1 and output the acquired current position information to the vehicle control unit 3. The wireless communication unit 10 is configured to receive travelling information on another vehicle around the vehicle 1 from the other vehicle and transmit travelling information on the vehicle 1 to the other vehicle (vehicle-to-vehicle communication). In addition, the wireless communication unit 10 is configured to receive infrastructure information from infrastructure equipment such as a traffic light and a marker lamp, and transmit the travelling information on the vehicle 1 to the infrastructure equipment (road-to-vehicle communication). The map information storage unit 11 is an external storage device such as a hard disk drive that stores map information, and is configured to output the map information to the vehicle control unit 3.

When the vehicle 1 travels in the autonomous driving mode, the vehicle control unit 3 generates autonomously at least one of a steering control signal, an accelerator control signal, and a brake control signal based on the travelling state information, the surrounding environment information, the current position information, the map information, and the like. The steering actuator 12 is configured to receive the steering control signal from the vehicle control unit 3 and control the steering device 13 based on the received steering control signal. The brake actuator 14 is configured to receive the brake control signal from the vehicle control unit 3 and control the brake device 15 based on the received brake control signal. The accelerator actuator 16 is configured to receive the accelerator control signal from the vehicle control unit 3 and control the accelerator device 17 based on the received accelerator control signal. As described above, in the autonomous driving mode, the traveling of the vehicle 1 is autonomously controlled by the vehicle system 2.

On the other hand, when the vehicle 1 travels in a manual driving mode, the vehicle control unit 3 generates the steering control signal, the accelerator control signal, and the brake control signal according to a manual operation of the driver with respect to the accelerator pedal, the brake pedal, and the steering wheel. As described above, in the manual driving mode, the steering control signal, the accelerator control signal, and the brake control signal are generated by the manual operation of the driver, and thus the travelling of the vehicle 1 is controlled by the driver.

Returning to FIG. 1, the sensor system 100 of the vehicle 1 includes a front LiDAR 6f, a rear LiDAR 6b, a left LiDAR 6l, and a right LiDAR 6r as the external sensor 6. The front LiDAR 6f is configured to acquire information on a front side of the vehicle 1. The rear LiDAR 6b is configured to acquire information on the rear of the vehicle 1. The left LiDAR 6l is configured to acquire information on a left side of the vehicle 1. The right LiDAR 6r is configured to acquire information on a right side of the vehicle 1.

In the example illustrated in FIG. 1, the front LiDAR 6f is provided at a front portion of the vehicle 1, the rear LiDAR 6b is provided at a rear portion of the vehicle 1, the left LiDAR 6l is provided at a left portion of the vehicle 1, and the right LiDAR 6r is provided at a right portion of the vehicle 1, but the present disclosure is not limited thereto. For example, the front LiDAR, the rear LiDAR, the left LiDAR, and the right LiDAR may be collectively disposed in a ceiling portion of the vehicle 1.

The sensor system 100 includes, as the lamp 7, a left headlamp 71 provided at a left portion of the front portion of the vehicle 1 and a right headlamp 7r provided at a right portion of the front portion of the vehicle 1. The sensor system 100 further includes a front window 1f and a rear window 1b as a window shield.

The sensor system 100 includes a cleaner system 110 (described in detail in FIG. 3) that removes foreign matter such as water droplets, mud, and dust adhering to the object to be cleaned or prevents the foreign matter from adhering to the object to be cleaned. For example, in the present embodiment, the cleaner system 110 includes a front window washer (hereinafter, referred to as a front WW) 101 capable of cleaning the front window 1f and a rear window washer (hereinafter, referred to as a rear WW) 102 capable of cleaning the rear window 1b. The cleaner system 110 includes a front sensor cleaner (hereinafter, referred to as a front SC) 103 capable of cleaning the front LiDAR 6f and a rear sensor cleaner (hereinafter, referred to as a rear SC) 104 capable of cleaning the rear LiDAR 6b. Further, the cleaner system 110 includes a right sensor cleaner (hereinafter, referred to as a right SC) 105 capable of cleaning the right LiDAR 6r and a left sensor cleaner (hereinafter, referred to as a left SC) 106 capable of cleaning the left LiDAR 6l. The cleaner system 110 further includes a right headlamp cleaner (hereinafter referred to as a right HC) 107 capable of cleaning the right headlamp 7r and a left headlamp cleaner (hereinafter referred to as a left HC) 108 capable of cleaning the left headlamp 71. Each of the cleaners 101 to 108 has one or more nozzles, and jets a cleaning medium such as high-pressure air or a cleaning liquid from a jetting port provided in the nozzle toward an object.

Figure 3:
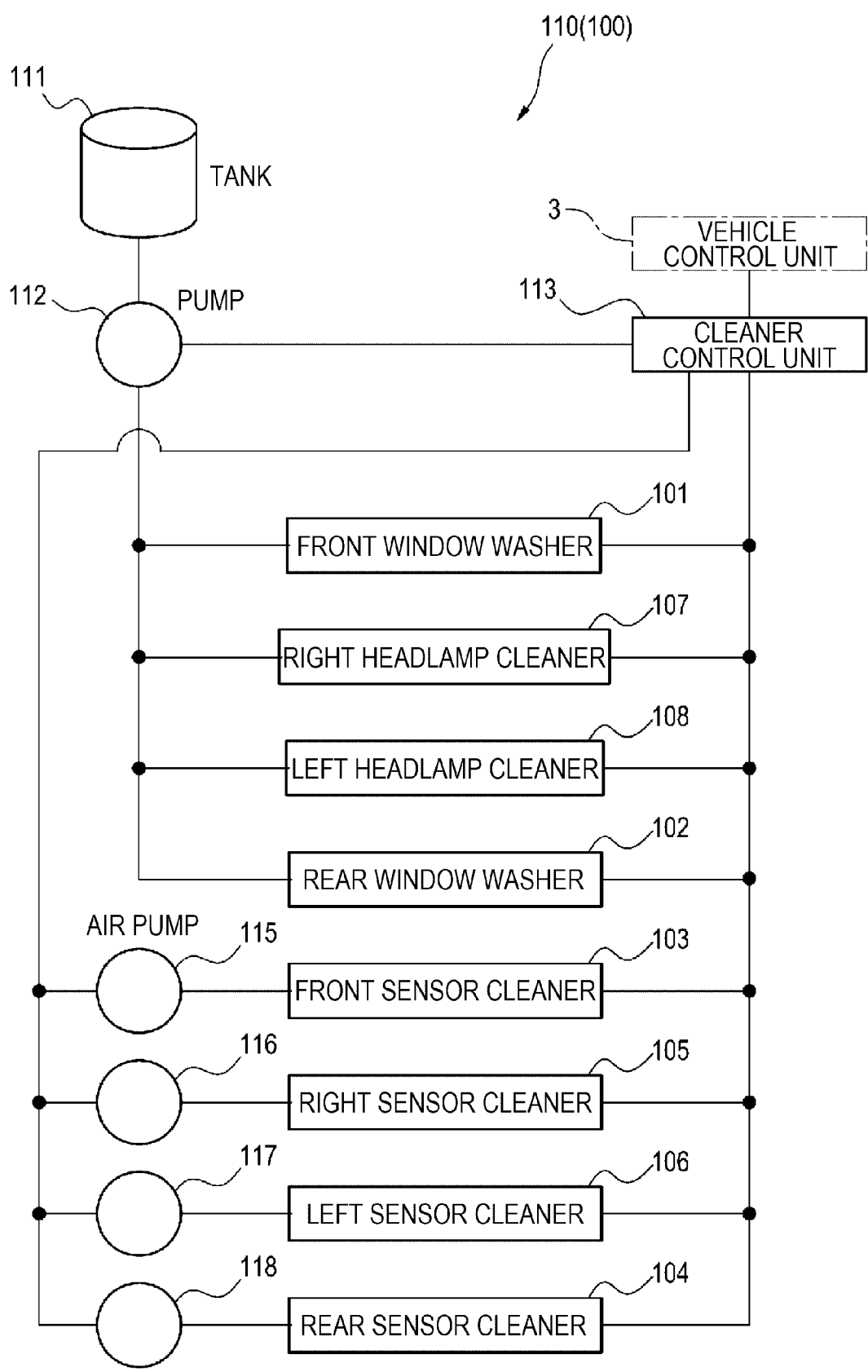
FIG. 3 is a block diagram of a cleaner system included in the sensor system of FIG. 1.

FIG. 3 is a block diagram of the cleaner system 110 included in the sensor system 100. The cleaner system 110 includes a tank 111, a pump 112, the cleaner control unit 113, and air pumps 115 to 118 in addition to the cleaners 101 to 108.

The front WW 101, the rear WW 102, the right HC 107, and the left HC 108 are connected to the tank 111 via the pump 112. The pump 112 sucks a cleaning liquid (an example of the cleaning medium) stored in the tank 111 and transfers the cleaning liquid to the front WW 101, the rear WW 102, the front SC 103, the rear SC 104, the right SC 105, the left SC 106, the right HC 107, and the left HC 108.

The air pumps 115 to 118 are connected to the front SC 103, the rear SC 104, the right SC 105, and the left SC 106, respectively. Each of the air pumps 115 to 118 generates high-pressure air (an example of the cleaning medium) and sends the generated high-pressure air to the front SC 103, the rear SC 104, the right SC 105, and the left SC 106.

Each of the cleaners 101 to 108 may be provided with an actuator (not illustrated) that causes the nozzle provided in the corresponding cleaner to be in an open state to jet the cleaning medium onto the object to be cleaned. The actuator provided in each of the cleaners 101 to 108 is electrically connected to the cleaner control unit 113. The pump 112 and the air pumps 115 to 118 are also electrically connected to the cleaner control unit 113. Operations of the cleaners 101 to 108, the pump 112, the air pumps 115 to 118, and the like are controlled by the cleaner control unit 113.

The cleaner control unit 113 is electrically connected to the vehicle control unit 3 and the sensor control unit 114 (see FIG. 2). The information acquired by the cleaner control unit 113, the information acquired by the sensor control unit 114, and the information acquired by the vehicle control unit 3 are transmitted and received between the control units.

First Embodiment

Figure 4:
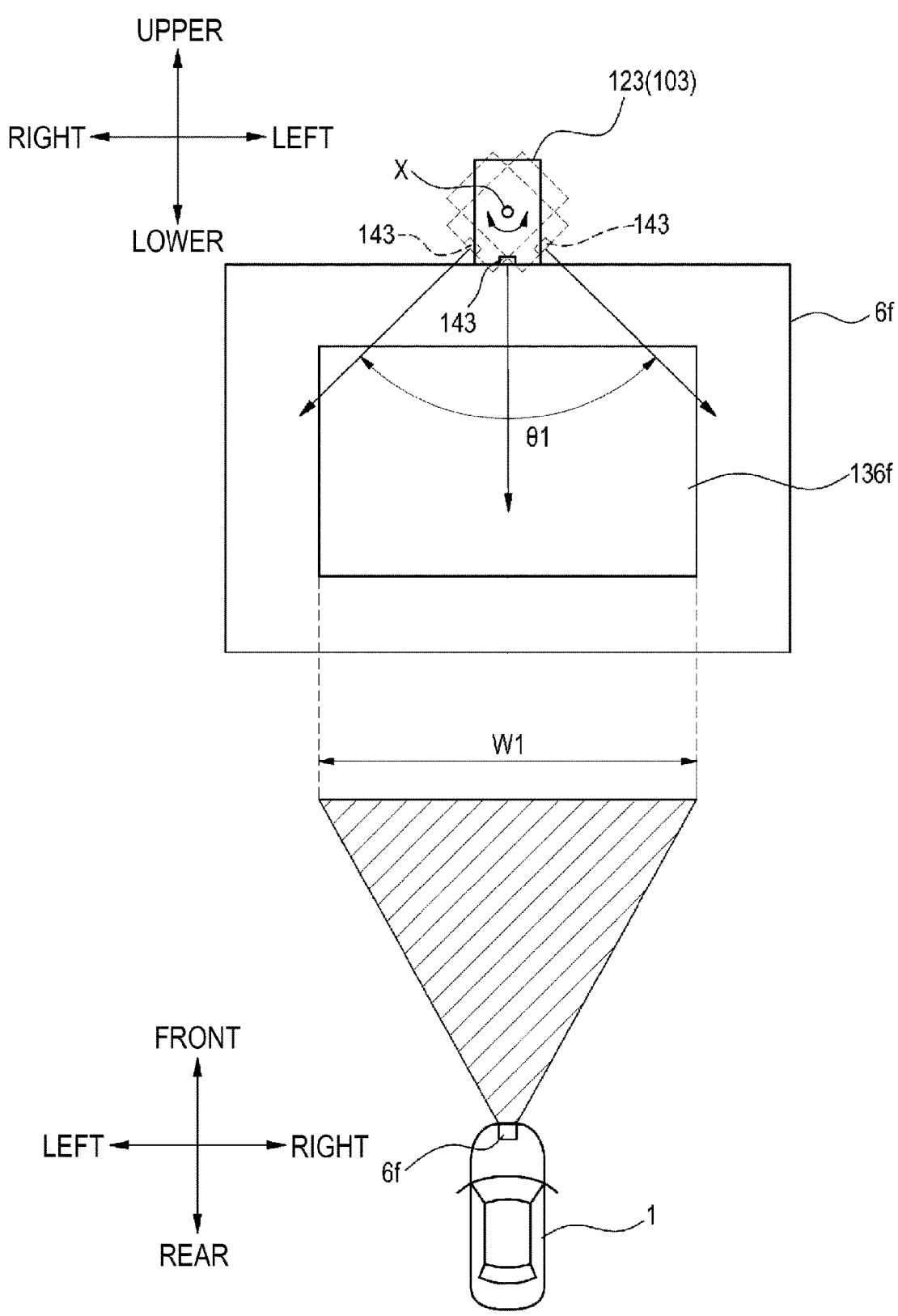
FIG. 4 is a diagram illustrating a movable range of a nozzle of a cleaner included in the cleaner system of FIG. 3 when a vehicle travels at a low speed.
Figure 5:
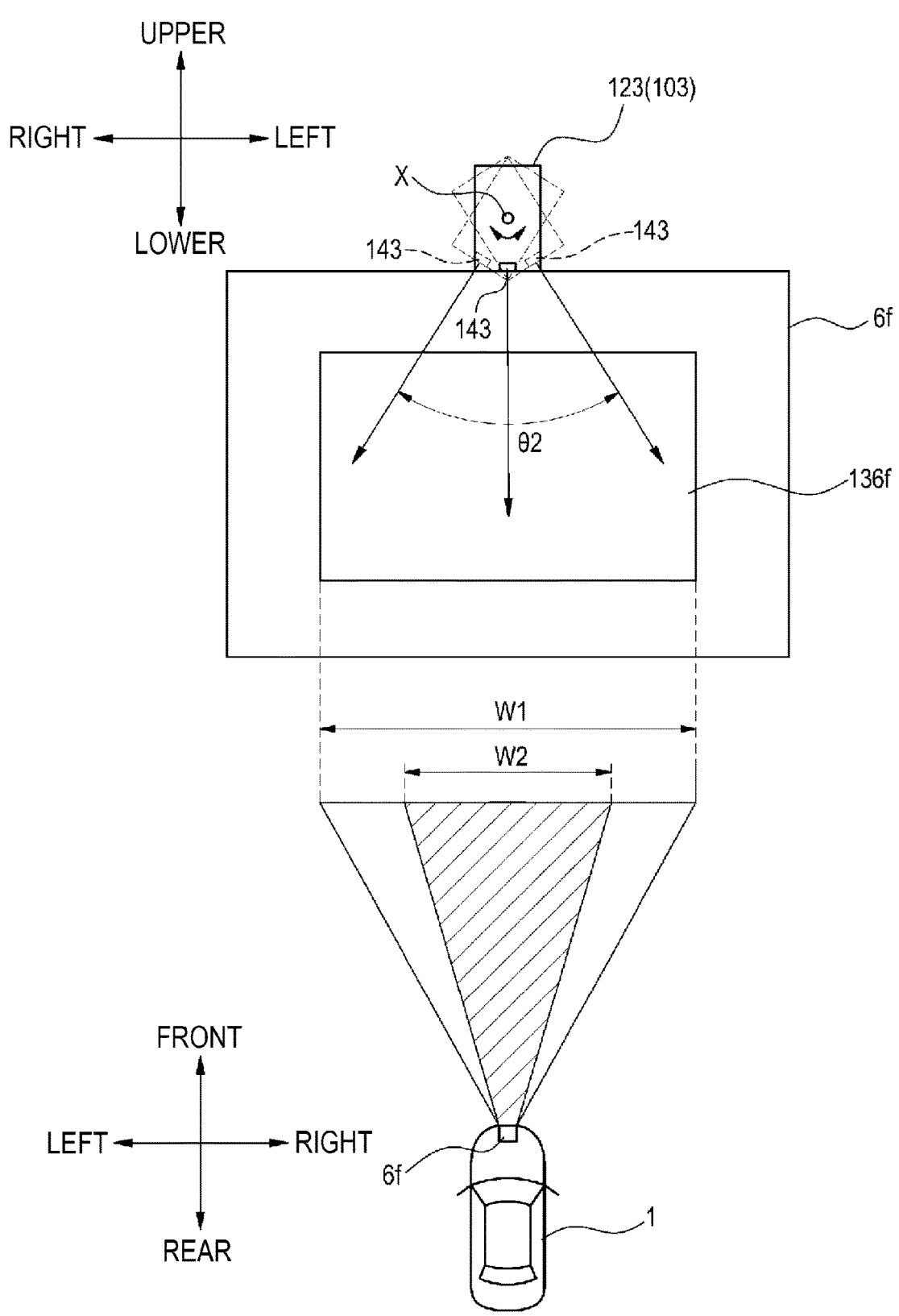
FIG. 5 is a diagram illustrating a movable range of the nozzle when the vehicle travels at a high speed.

Next, an operation example of the cleaners 101 to 108 in the cleaner system 110 having the above-described configuration will be described with reference to FIGS. 4 and 5. FIGS. 4 and 5 are diagrams illustrating operation examples of the nozzles of the cleaners 101 to 108 according to the first embodiment. In the example illustrated in FIGS. 4 and 5, among the nozzles of the cleaners 101 to 108, a nozzle 123 of the front SC 103 that cleans the front LiDAR 6f provided at the front portion of the vehicle 1 will be described. Note that the nozzles other than the front SC 103 perform the same operation, and therefore description thereof is omitted.

As illustrated in FIGS. 4 and 5, the nozzle 123 of the front SC 103 is provided at an upper central portion of the front LiDAR 6f. The front LiDAR 6f has a rectangular shape in a front view, and a windshield portion 136f which is a surface to be cleaned is provided at a central portion thereof. The nozzle 123 has a jetting port 143. The jetting port 143 is provided on a lower surface of the nozzle 123 so as to face the windshield portion 136f. The jetting port 143 is adjusted such that the high-pressure air jetted from the jetting port 143 is jetted from an upper direction toward a lower direction of the windshield portion 136f. The nozzle 123 is provided so as to be rotatable about a rotation axis X (an axis extending in a front-back direction of a paper surface of FIG. 4). The nozzle 123 is configured to swing a head thereof in the left-right direction by rotating around the rotation axis X, and to be capable of jetting the high-pressure air jetted from the jetting port 143 from a left end area to a right end area of the windshield portion 136f.

A movable range of the nozzle 123 by the rotation is changed according to a travelling speed of the vehicle 1. For example, a "first threshold speed" serving as a reference for changing the movable range of the nozzle 123 is set as the travelling speed of the vehicle 1. The vehicle control unit 3 detects the travelling speed of the vehicle 1 by a speed sensor that is the internal sensor 5, and transmits the detected travelling speed as vehicle speed information to the cleaner control unit 113. The cleaner control unit 113 that has received the vehicle speed information from the speed sensor determines the movable range of the nozzle 123 based on the vehicle speed information. Specifically, when the travelling speed of the vehicle 1 is equal to or lower than the first threshold speed, the cleaner control unit 113 sets the movable range of the nozzle 123 to be larger than when the travelling speed is higher than the first threshold speed.

FIG. 4 is a diagram illustrating the movable range of the nozzle 123 and a sensing range of the front LiDAR 6f when the travelling speed of the vehicle 1 is equal to or lower than the first threshold speed. FIG. 5 is a diagram illustrating the movable range of the nozzle 123 and the sensing range of the front LiDAR 6f when the travelling speed of the vehicle 1 is higher than the first threshold speed.

As illustrated in FIG. 4, when the travelling speed of the vehicle 1 is equal to or lower than the first threshold speed, a swinging angle $\theta 1$ of the nozzle 123 in the left-right direction, which is the movable range of the nozzle 123, is set such that the high-pressure air jetted from the jetting port 143 is jetted from the left end area to the right end area of the windshield portion 136f.

In contrast, as illustrated in FIG. 5, when the travelling speed of the vehicle 1 is higher than the first threshold speed, a swinging angle $\theta 2$ of the nozzle 123 in the left-right direction is set to be smaller than the swinging angle $\theta 1$. That is, the movable range (an example of a second movable range) of the nozzle 123 when the vehicle speed is higher than the first threshold speed is set to be narrower than the movable range (an example of a first movable range) of the nozzle 123 when the vehicle speed is equal to or lower than the first threshold speed. Specifically, when the vehicle speed is higher than the first threshold speed, the high-pressure air jetted from the jetting port 143 is jetted around a central area of the windshield portion 136f, and an area where the high-pressure air is not jetted is set to be present at a left end or a right end of the windshield portion 136f. The second movable range (the swinging angle $\theta 2$) of the nozzle 123 is set to be a range including the central area of the first movable range (the swinging angle $\theta 1$).

When the vehicle 1 is travelling at a relatively low speed, for example, when the vehicle 1 is travelling on a general road, it is necessary to set a relatively wide area in front of the vehicle 1 as a first sensing range W1 of the front LiDAR 6f as illustrated in FIG. 4 in order to be able to detect not only a preceding vehicle and an oncoming vehicle but also a pedestrian on a vehicle front side. Therefore, for example, when the vehicle 1 is travelling on a general road, the movable range of the nozzle 123 is a first movable range $\theta 1$ in which the high-pressure air is jetted from the left end area to the right end area of the windshield portion 136f as illustrated in FIG. 4. The first threshold speed at which the movable range of the nozzle 123 changes may be set to 70 km/h, for example.

On the other hand, when the vehicle 1 is travelling at a high speed, for example, when the vehicle 1 is travelling on a highway, it is often required to sense a relatively narrow area in front of and far from the vehicle 1 rather than to comprehensively sense the entire area in front of the vehicle 1 including a lateral area in which a pedestrian or the like is present. Therefore, when the vehicle 1 is travelling at a high speed, as illustrated in FIG. 5, the sensing range of the front LiDAR 6f may be set to a second sensing range W2 that is narrower than the first sensing range W1. Therefore, for example, when the vehicle 1 is travelling on a highway, the movable range of the nozzle 123 is changed to the second movable range $\theta 2$ in which the high-pressure air is jetted around the central area of the windshield portion 136f as illustrated in FIG. 5. However, even when the vehicle 1 is travelling on a highway, when the vehicle 1 is travelling at a speed lower than or equal to the first threshold speed depending on a road condition, the movable range of the nozzle 123 is preferably the first movable range $\theta 1$ illustrated in FIG. 4. The cleaner control unit 113 can determine whether the vehicle 1 is travelling on a general road or a highway based on the current position information of the vehicle 1 acquired by the GPS 9 or electronic toll collection (ETC) system information.

As described above, the cleaner system 110 according to the present embodiment includes the front SC 103 (an example of a cleaner) including the nozzle 123 having the jetting port 143 that jets the high-pressure air (the example of the cleaning medium) to the windshield portion 136f that is a surface to be cleaned of the front LiDAR 6f (an example of a sensor) mounted on the vehicle 1, and the cleaner control unit 113 (an example of a control unit) that controls an operation of the front SC 103. The nozzle 123 is configured to be rotatable in an operation state of the front SC 103. The cleaner control unit 113 is configured to change the movable range of the nozzle 123 according to a travelling condition such as the vehicle speed of the vehicle 1. According to this configuration, by cleaning the front LiDAR 6f while changing the movable range of the nozzle 123 according to the travelling condition such as the vehicle speed of the vehicle 1, it is possible to effectively clean the front LiDAR 6f according to the travelling situation of the vehicle 1.

In the present embodiment, the travelling condition for changing the movable range of the nozzle 123 includes at least one of the vehicle speed of the vehicle 1 and the road condition on which the vehicle 1 is travelling, thereby effectively cleaning the front LiDAR 6f. The road condition includes, for example, a situation in which the vehicle 1 is travelling on a general road or travelling on a highway.

In the present embodiment, the cleaner control unit 113 controls the nozzle 123 such that the second movable range $\theta 2$, which is a movable range when the vehicle speed is higher than the first threshold speed or the vehicle 1 is travelling on a highway, is narrower than the first movable range $\theta 1$, which is a movable range when the vehicle speed is equal to or lower than the first threshold speed or the vehicle 1 is travelling on a general road. The second sensing range W2 of the front LiDAR 6f when the vehicle 1 is travelling at a high speed often needs to be set to be narrower than the first sensing range W1 of the front LiDAR 6f when the vehicle 1 is travelling at a low speed. Therefore, when the vehicle 1 is travelling at a higher speed than when the vehicle 1 is travelling at a low speed, by narrowing the movable range of the nozzle 123, it is possible to perform efficient cleaning corresponding to a desired sensing range of the front LiDAR 6f that changes according to the vehicle speed.

In the present embodiment, the second movable range $\theta 2$ of the nozzle 123 includes at least the central area of the first movable range $\theta 1$ of the nozzle 123. As described above, by including the central area in front of the vehicle 1 corresponding to the second sensing range W2 of the front LiDAR 6f in the second movable range $\theta 2$ of the nozzle 123 when the vehicle 1 is travelling at a high speed, it is possible to effectively clean the front LiDAR 6f according to a sensing range (the second sensing range W2) of the front LiDAR 6f during high-speed travelling.

In the operation example of the nozzle 123 of the front SC 103 described above, the case has been described in which the movable range of the nozzle 123 is set to the first movable range θ1 when the travelling speed of the vehicle 1 is equal to or lower than the first threshold speed, and the movable range of the nozzle 123 is set to the second movable range θ2 when the travelling speed is higher than the first threshold speed, but the present disclosure is not limited thereto. For example, when the travelling speed of the vehicle 1 is equal to or lower than the first threshold speed, the movable range of the nozzle 123 may be further changed according to the travelling condition of the vehicle 1.

For example, the travelling speed of the vehicle 1 may be set to a "second threshold speed" serving as a reference for changing the movable range of the nozzle 123. The second threshold speed is a travelling speed lower than the first threshold speed. The cleaner control unit 113 receives the vehicle speed information on the vehicle 1 detected by the speed sensor, and when the travelling speed of the vehicle 1 is equal to or higher than the second threshold speed and is equal to or lower than the first threshold speed, the cleaner control unit 113 sets the movable range of the nozzle 123 (an example of a third movable range) to be larger than the movable range of the nozzle 123 when the travelling speed is higher than the first threshold speed and smaller than the movable range of the nozzle 123 when the travelling speed is lower than the second threshold speed.

Figure 6:
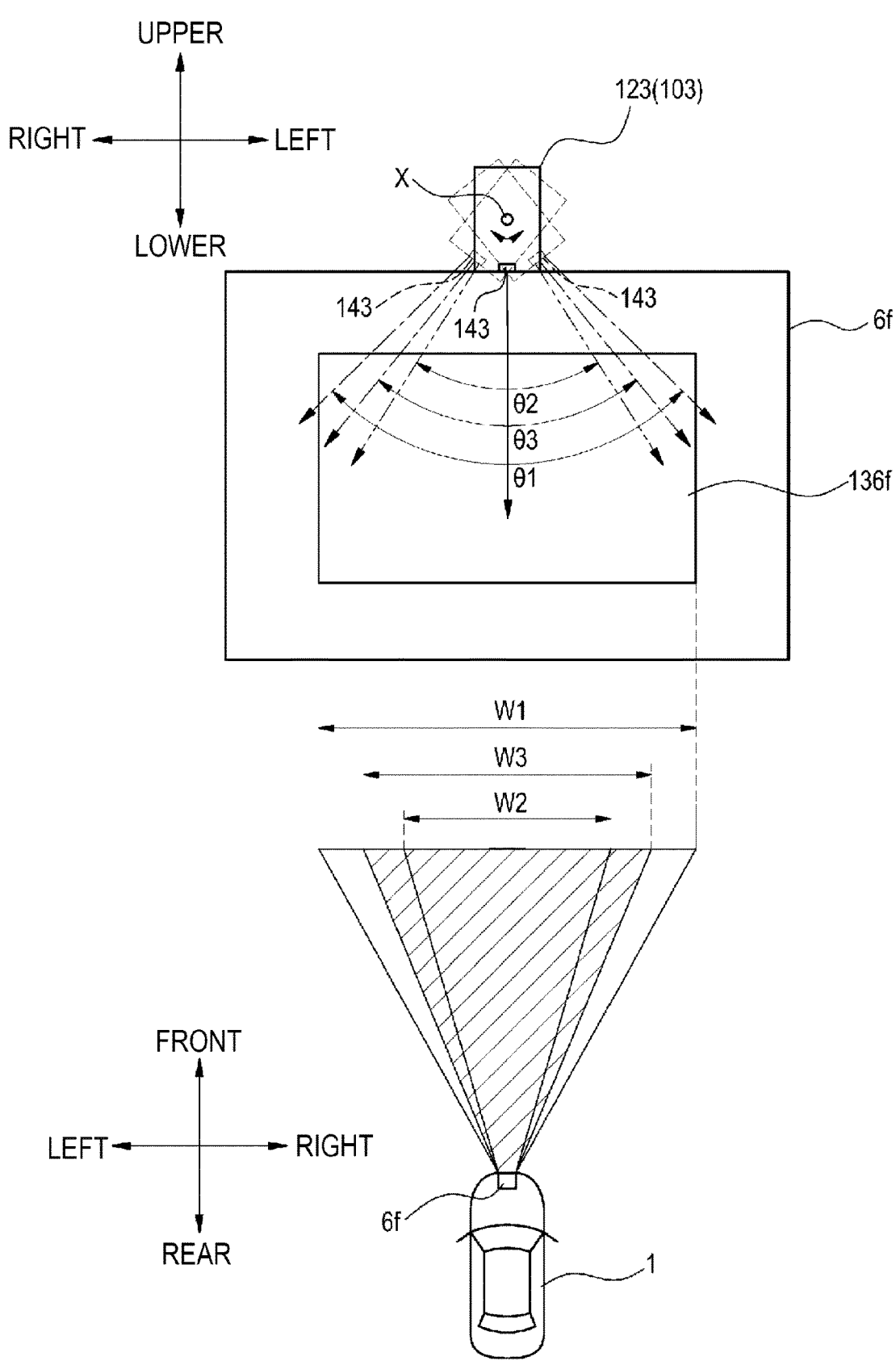
FIG. 6 is a diagram illustrating a movable range of the nozzle when the vehicle travels at a medium speed.

FIG. 6 is a diagram illustrating the movable range of the nozzle 123 and the sensing range of the front LiDAR 6f when the travelling speed of the vehicle 1 is equal to or higher than the second threshold speed and equal to or lower than the first threshold speed. As illustrated in FIG. 6, the third sensing range W3, which is the sensing range of the front LiDAR 6f, when the travelling speed of the vehicle 1 is equal to or higher than the second threshold speed and is equal to or lower than the first threshold speed may be set to be wider than the second sensing range W2, which is the sensing range of the front LiDAR 6f, when the travelling speed of the vehicle 1 is lower than the second threshold speed and narrower than the first sensing range W1, which is the sensing range of the front LiDAR 6f, when the travelling speed of the vehicle 1 is higher than the first threshold speed. Therefore, when the travelling speed of the vehicle 1 is equal to or higher than the second threshold speed and equal to or lower than the first threshold speed, a swinging angle θ3 of the nozzle 123 in the left-right direction is set to be larger than the swinging angle θ2 of the nozzle 123 in the left-right direction when the travelling speed is higher than the first threshold speed, and smaller than the swinging angle θ1 of the nozzle 123 in the left-right direction when the travelling speed is lower than the second threshold speed.

That is, when the travelling speed of the vehicle 1 is equal to or higher than the second threshold speed and equal to or lower than the first threshold speed, the third movable range θ3, which is the movable range of the nozzle 123, is set to be wider than the second movable range θ2, which is the movable range of the nozzle 123 when the travelling speed is higher than the first threshold speed, and to be narrower than the first movable range θ1, which is the movable range of the nozzle 123 when the travelling speed is lower than the second threshold speed. An area where the high-pressure air is jetted from the jetting port 143 toward the windshield portion 136f includes the central area of the windshield portion 136f where the high-pressure air is jetted when the travelling speed is higher than the first threshold speed, is set to be narrower than the area where the high-pressure air is jetted when the travelling speed is lower than the second threshold speed, and is set such that the area where the high-pressure air is not jetted is present at the left end or the right end of the windshield portion 136f.

The second threshold speed at which the movable range of the nozzle 123 changes is set to, for example, 30 km/h. Accordingly, for example, when the vehicle 1 is travelling on a general road, the movable range of the nozzle 123 when the vehicle 1 is travelling at a medium speed of about 40 km/h to 50 km/h and the movable range of the nozzle 123 when the vehicle 1 is travelling at a low speed (slow) of about 10 km/h to 20 km/h can be changed. Even when the vehicle 1 is travelling on a highway, the movable range of the nozzle 123 may be changed at the second threshold speed when the vehicle 1 is travelling at a speed lower than or equal to the first threshold speed depending on the road condition.

According to the operation example as illustrated in FIG. 6, the cleaner control unit 113 sets the second threshold speed lower than the first threshold speed, and controls the nozzle 123 such that the third movable range θ3 of the nozzle 123 when the vehicle speed is equal to or higher than the second threshold speed and equal to or lower than the first threshold speed is narrower than the first movable range θ1 of the nozzle 123 when the travelling speed is lower than the second threshold speed and wider than the second movable range θ2 of the nozzle 123 when the travelling speed is higher than the first threshold speed. As described above, by finely changing the movable range of the nozzle 123, cleaning efficiency is further improved.

First Modification

Figure 7:
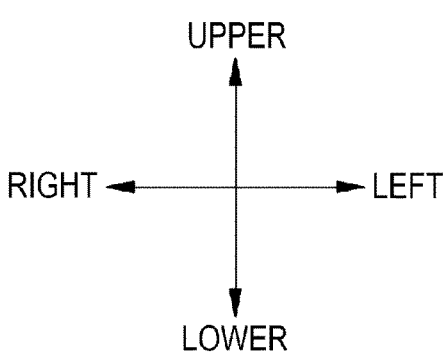
FIG. 7 illustrates a configuration of a nozzle of a cleaner according to a first modification.
Figure 7:
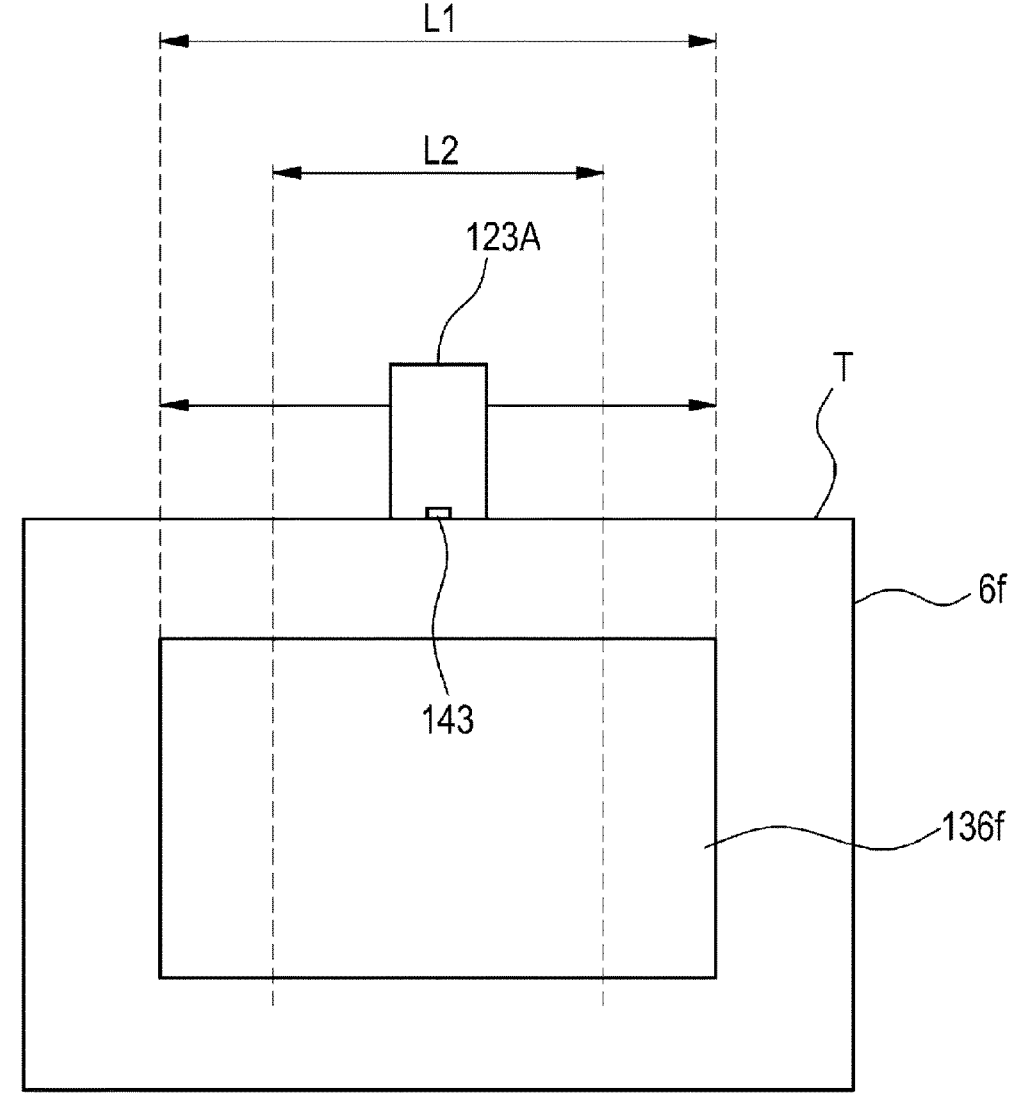

In the first embodiment described above, the case has been described in which the movable range of the nozzle 123 changes according to a rotation amount (a magnitude of the swinging angle θ) of the nozzle 123 rotating around the rotation axis X, but the present disclosure is not limited thereto. FIG. 7 is a diagram illustrating a configuration of a nozzle 123A according to a first modification. For example, as illustrated in FIG. 7, the nozzle 123A that slidingly moves in the left-right direction along an upper side T of the front LiDAR 6f may be provided, and a movable range of the nozzle 123A may be changed according to a slide amount of the nozzle 123A.

In the first modification of FIG. 7, when the travelling speed of the vehicle 1 is equal to or lower than the first threshold speed, a slide amount L1 of the nozzle 123A in the left-right direction, that is, the first movable range of the nozzle 123A is set such that the high-pressure air jetted from the jetting port 143 is jetted from the left end area to the right end area of the windshield portion 136f. In contrast, when the travelling speed of the vehicle 1 is higher than the first threshold speed, a slide amount L2 of the nozzle 123A in the left-right direction is set to be smaller than the slide amount L1. That is, when the travelling speed of the vehicle 1 is higher than the first threshold speed, the second movable range (slide amount) L2 of the nozzle 123A is set to be narrower than the first movable range (slide amount) L1. Specifically, in the second movable range L2, the high-pressure air jetted from the jetting port 143 is jetted around the central area of the windshield portion 136f, and the area where the high-pressure air is not jetted is present at the left end or the right end of the windshield portion 136f. As described above, by slidingly moving the nozzle 123A to change the movable range according to the travelling condition such as the vehicle speed, it is possible to achieve the same effect as the operation example of FIG. 4 and the like in which the nozzle 123 is rotated.

In the first embodiment described above, the road condition, which is an example of the travelling condition of the vehicle 1 for changing the movable range of the nozzles 123 and 123A, is based on whether the vehicle 1 is travelling on a general road or a highway, but the present disclosure is not limited to thereto. For example, the road condition may include a weather condition or a road condition of a road on which the vehicle 1 is travelling. For example, when the road surface on which the vehicle 1 is travelling is wet (or during rainy weather), the travelling speed of the vehicle 1 is often lower than when the road surface is not wet (or during sunny weather). In addition, in the case of rainy weather, it is often necessary to focus on sensing not only a preceding vehicle or an oncoming vehicle in front of the vehicle but also a pedestrian on a side of the vehicle. That is, it is often necessary to expand the sensing range of the front LiDAR 6f in rainy weather compared to sunny weather. Here, it is conceivable to make the movable range of the nozzles 123 and 123A when the road surface is wet (or during rainy weather) larger than the movable range of the nozzles 123 and 123A when the road surface is not wet (or during sunny weather). As described above, by changing the movable range of the nozzles 123 and 123A according to the road surface condition or the weather condition, a predetermined area of the windshield portion 136f corresponding to a desired sensing range of the front LiDAR 6f can be intensively cleaned by the high-pressure air jetted from the nozzles 123 and 123A.

Second Embodiment

First Operation Control Example

Next, a first operation control example according to a second embodiment of the cleaners 101 to 108 in the cleaner system 110 having the above-described configuration will be described with reference to FIGS. 4 and 8. In the first operation control example, a normal mode in which the nozzles of the cleaners 101 to 108 are controlled in a normal movable range and a predetermined mode in which the nozzles are controlled in a movable range different from the normal movable range are executed.

FIG. 4 is a diagram illustrating an operation control of the nozzle when the external sensor 6 is cleaned in the normal mode. FIG. 8 is a diagram illustrating an operation control of the nozzle when the external sensor 6 is cleaned in the predetermined mode different from the normal mode. In the second embodiment, as in the first embodiment, among the nozzles of the cleaners 101 to 108, the nozzle 123 of the front SC 103 for cleaning the front LiDAR 6f provided at the front portion of the vehicle 1 will be described. Note that the nozzles other than the front SC 103 perform the same operation, and therefore description thereof is omitted. As illustrated in FIG. 4, when the front LiDAR 6f is cleaned in the normal mode, the swinging angle θ1 of the nozzle 123 is controlled to a range in which the high-pressure air jetted from the jetting port 143 is jetted from the left end area to the right end area of the windshield portion 136f.

Figure 8:
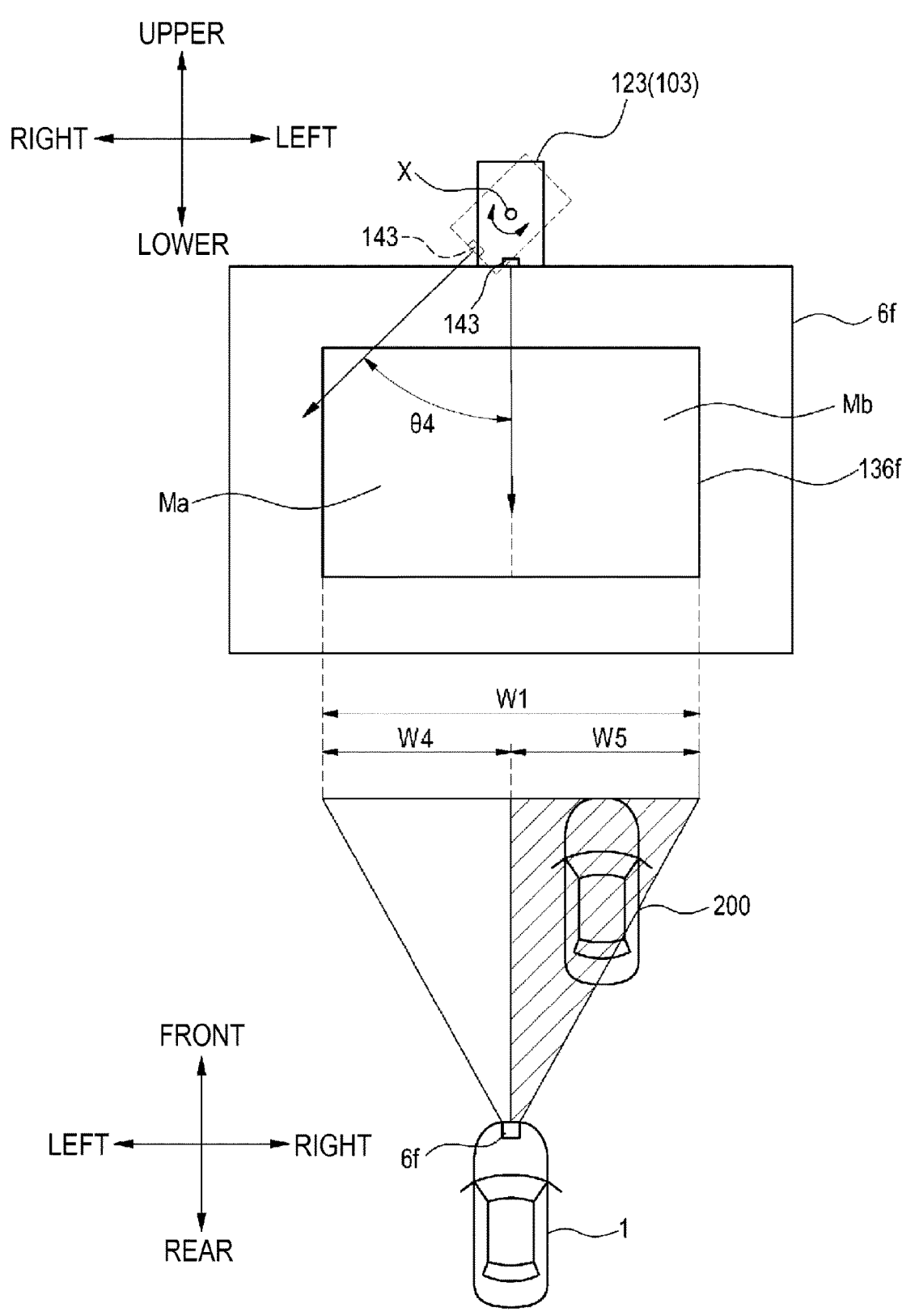
FIG. 8 is a diagram illustrating an operation control in a predetermined mode of a nozzle of a cleaner according to a second embodiment.

On the other hand, as illustrated in FIG. 8, when the front LiDAR 6f is cleaned in the predetermined mode, a swinging angle θ4 of the nozzle 123 is controlled to a range in which the high-pressure air jetted from the jetting port 143 of the nozzle 123 is jetted toward only the corresponding specific area corresponding to the position of the object of the vehicle 1, in the entire area of the windshield portion 136f of the front LiDAR 6f.

For example, description will be made assuming that the vehicle 1 is travelling in a left lane (travelling lane) on a road having two lanes in each direction. It is assumed that the cleaner control unit 113 of the vehicle 1 determines that, for example, a preceding vehicle 200 (object) travelling in the right lane (an overtaking lane) is present based on image information of the surroundings of the vehicle acquired by the front LiDAR 6f. An image range around the vehicle acquired by the front LiDAR 6f is an acquired image range W1 in front of the vehicle. The acquired image range W1 is substantially the same range as the first sensing range W1 of the front LiDAR 6f illustrated in FIG. 4. In this example, the acquired image range W1 is divided into two ranges of a right acquired image range W4 and a left acquired image range W5 in the left-right direction in front of the vehicle. The cleaner control unit 113 specifies in which range of the acquired image range W1 the preceding vehicle 200 is present in front is located. In the example illustrated in FIG. 8, the cleaner control unit 113 specifies that the preceding vehicle 200 is present in the right acquired image range W4.

Next, the cleaner control unit 113 specifies a corresponding specific area of the windshield portion 136f of the front LiDAR 6f corresponding to the right acquired image range W4 in which the preceding vehicle 200 is specified to be present. The windshield portion 136f is divided into two areas of a right corresponding specific area Ma and a left corresponding specific area Mb in the left-right direction of the front LiDAR 6f. The cleaner control unit 113 specifies the right corresponding specific area Ma as the corresponding specific area corresponding to the right acquired image range W4 in which the preceding vehicle 200 is present. Then, the cleaner control unit 113 controls the movable range of the nozzle 123 such that the high-pressure air is jetted only toward the right corresponding specific area Ma of the windshield portion 136f. That is, the cleaner control unit 113 controls the movable range of the nozzle 123 such that the movable range (swinging angle) θ4 around the rotation axis X of the nozzle 123 in the predetermined mode is narrower than the movable range (swinging angle) θ1 around the rotation axis X of the nozzle 123 in the normal mode.

In a travelling state illustrated in FIG. 8 in which it is determined that the preceding vehicle 200 is present in the right acquired image range W4, for example, when it is determined that a new preceding vehicle is present in front of the travelling lane in which the vehicle 1 travels, that is, in the left acquired image range W5 together with the presence of the preceding vehicle 200, the cleaner control unit 113 switches the movable range of the nozzle 123 such that the high-pressure air is also jetted toward the left corresponding specific area Mb of the windshield portion 136f corresponding to the left acquired image range W5. That is, when it is determined that a plurality of preceding vehicles are present, the cleaner control unit 113 returns to the normal mode illustrated in FIG. 4 and switches the movable range of the nozzle 123 to clean the front LiDAR 6f.

Second Operation Control Example

Next, a second operation control example of cleaning the external sensor 6 using the cleaners 101 to 108 will be described. In the second operation control example, a normal mode in which the nozzles of the cleaners 101 to 108 are moved at a normal operation speed and a predetermined mode in which the nozzles are moved at an operation speed different from the normal operation speed are executed. Also in this operation control example, the nozzle 123 of the front SC 103 for cleaning the front LiDAR 6f provided in the front portion of the vehicle 1 will be described.

The movable range of the nozzle 123 in the predetermined mode in the second operation control example is controlled to a movable range in which the nozzle 123 rotates around the rotation axis X and the high-pressure air jetted from the jetting port 143 is jetted from the left end area to the right end area of the windshield portion 136f, similarly to the nozzle 123 illustrated in FIG. 4. In the predetermined mode, the rotation speed of the nozzle 123 in the corresponding specific area of the windshield portion 136f corresponding to the acquired image range W4 in which the preceding vehicle 200 that is the object is specified to be present, in the acquired image range W1 (see FIG. 8) in front of the vehicle acquired by the front LiDAR 6f, is controlled to be higher or lower than the rotation speed of the nozzle 123 in the corresponding specific area of the windshield portion 136f corresponding to the acquired image range W5 in which the object is specified to be absent.

For example, by controlling the rotation speed of the nozzle 123 to be increased in the corresponding specific area of the windshield portion 136f corresponding to the acquired image range W4 in which the preceding vehicle 200 is specified to be present, it is possible to make the number of times of jetting the high-pressure air to the corresponding specific area larger than the number of times of jetting the high-pressure air to the corresponding specific area in which the object is absent.

Alternatively, for example, by controlling the rotation speed of the nozzle 123 to be decreased in the corresponding specific area of the windshield portion 136f corresponding to the acquired image range W4 in which the preceding vehicle 200 is specified to be present, it is possible to make jetting time of the high-pressure air for the corresponding specific area longer than jetting time for the corresponding specific area corresponding to the acquired image range W5 in which the object is specified to be absent.

Whether to increase or decrease the rotation speed of the nozzle 123 only in a specific area of the windshield portion 136f in the predetermined mode can be appropriately changed according to the travelling situation of the vehicle 1 and the type of foreign matter adhering to the windshield portion 136f.

The cleaner control unit 113 may perform a control so as to change a jetting speed of the high-pressure air jetted from the jetting port 143 of the nozzle 123, instead of changing the rotation speed of the nozzle 123 with respect to the corresponding specific area of the windshield portion 136f corresponding to a position of the object as described above, or changing the rotation speed of the nozzle 123 with respect to the corresponding specific area. For example, the cleaner control unit 113 controls the jetting speed of the high-pressure air with respect to the corresponding specific area of the windshield portion 136f corresponding to the acquired image range W4 in which the preceding vehicle 200 is specified to be present to be higher than the jetting speed of the high-pressure air with respect to the corresponding specific area of the windshield portion 136f corresponding to the acquired image range W5 in which the preceding vehicle 200 is specified to be absent.

The cleaner control unit 113 may perform a control to change a jetting amount of the high-pressure air jetted from the jetting port 143 of the nozzle 123, instead of changing the rotation speed of the nozzle 123 with respect to the corresponding specific area of the windshield portion 136f corresponding to the position of the object as described above, or changing the rotation speed of the nozzle 123 with respect to the corresponding specific area. For example, the cleaner control unit 113 controls the jetting amount of the high-pressure air with respect to the corresponding specific area of the windshield portion 136f corresponding to the acquired image range W4 in which the preceding vehicle 200 is specified to be present to be larger than the jetting amount of the high-pressure air with respect to the corresponding specific area of the windshield portion 136f corresponding to the acquired image range W5 in which the preceding vehicle 200 is specified to be absent.

The cleaning may be performed by combining two or more requirements of the movable range of the nozzle 123, the operation speed of the nozzle 123, the jetting speed of the high-pressure air, and the jetting amount of the high-pressure air described in the first operation control example and the second operation control example.

As described above, the cleaner system 110 according to the present embodiment includes the front SC 103 (the example of the cleaner) including the nozzle 123 having the jetting port 143 that jets the high-pressure air (the example of the cleaning medium) to the windshield portion 136f that is a surface to be cleaned of the front LiDAR 6f (the example of the sensor) capable of detecting an object around the vehicle, and the cleaner control unit 113 (the example of the control unit) that controls the operation of the front SC 103. The nozzle 123 is configured to be rotatable in the operation state of the front SC 103. The cleaner control unit 113 controls a movement of the nozzle 123 so as to clean an area (the corresponding specific area) corresponding to the object on the windshield portion 136f in the predetermined mode different from the normal mode. According to this configuration, by controlling the movement of the nozzle 123 according to the position of the object around the vehicle, it is possible to effectively clean the sensor such as the front LiDAR 6f and maintain the detection accuracy of the sensor according to the surrounding environment of the vehicle 1.

In the present embodiment, the windshield portion 136f as the surface to be cleaned includes a plurality of corresponding specific areas, for example, the right corresponding specific area Ma and the left corresponding specific area Mb. Then, the cleaner control unit 113 changes the movable range of the nozzle 123 so as to jet the high-pressure air toward only the corresponding specific area corresponding to the position of the object among the plurality of corresponding specific areas. According to this configuration, by jetting the high-pressure air only to the corresponding specific area (the area in which the object is included in the sensing range of the front LiDAR 6f) corresponding to the position of the object in the windshield portion 136f, the area of the windshield portion 136f corresponding to the position of the object can be carefully cleaned, and the detection accuracy of the front LiDAR 6f may be maintained by omitting unnecessary cleaning.

In the present embodiment, when the cleaner control unit 113 determines that there is an object different from the specified object together with the specified object after the cleaning in the predetermined mode is started, the cleaner control unit 113 may switch from the predetermined mode to the cleaning in the normal mode. When there are a plurality of objects, the entire windshield portion 136f is likely to be the sensing range of the object. Therefore, in this case, by returning to the normal mode, cleanliness of the entire windshield portion 136f can be maintained.

In the present embodiment, the cleaner control unit 113 executes the predetermined mode such that at least one of the movable range of the nozzle 123, the operation speed of the nozzle 123, the jetting speed of the high-pressure air, and the jetting amount of the high-pressure air is different from that in the normal mode. According to this configuration, the high-pressure air is intensively jetted to the area of the windshield portion 136f corresponding to the position of the object (the area in which the object is included in the sensing range), so that the corresponding specific area of the windshield portion 136f can be carefully cleaned.

Second Modification

Figure 9:
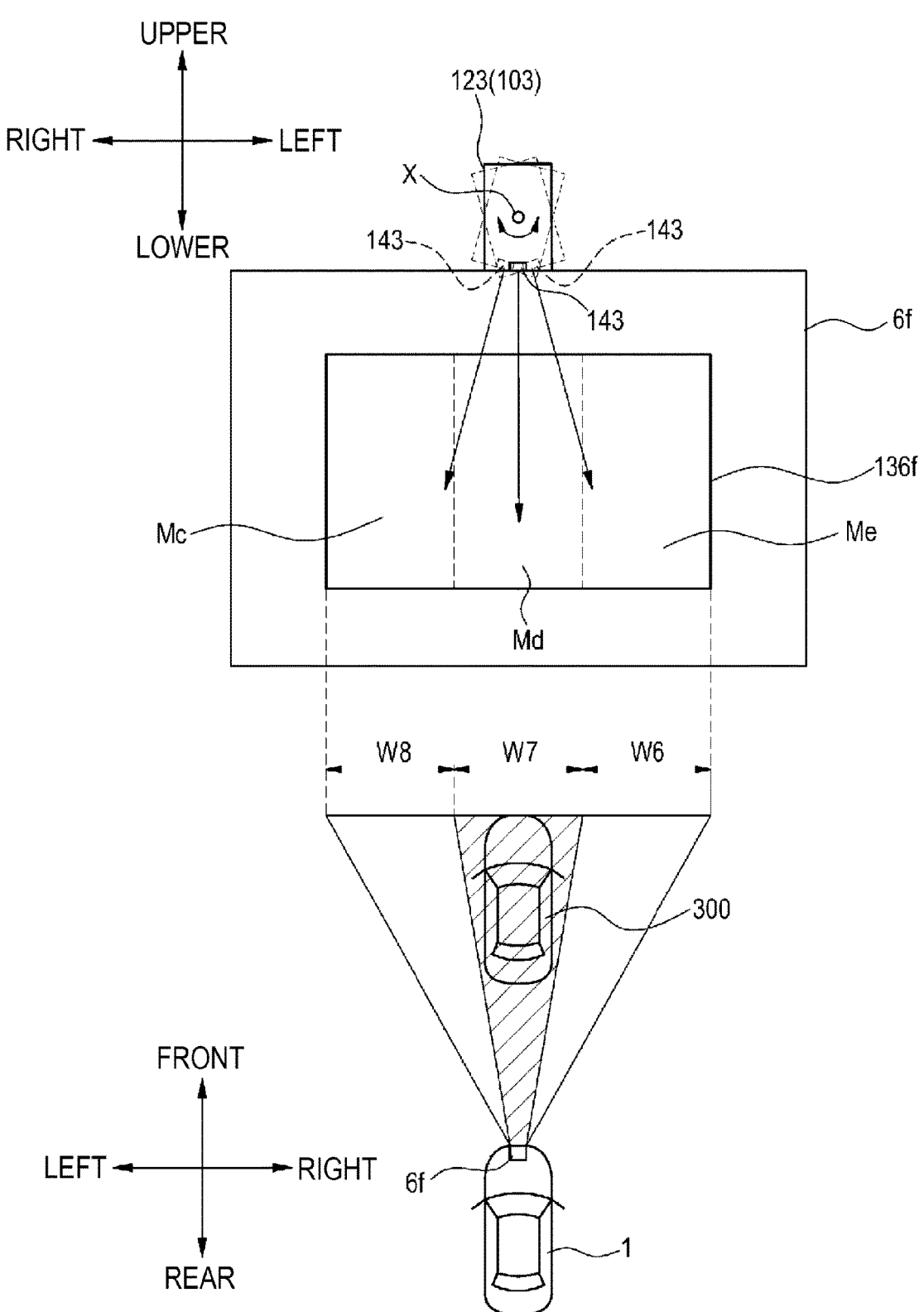
FIG. 9 is a diagram illustrating an operation control of a nozzle according to a second modification.

FIG. 9 is a diagram illustrating an operation control example of the nozzle 123 according to a second modification. As illustrated in FIG. 9, the acquired image range W1 in front of the vehicle acquired by the front LiDAR 6f and the corresponding specific area of the windshield portion 136f that is the surface to be cleaned of the front LiDAR 6f may be divided into, for example, three areas. Specifically, the acquired image range W1 in front of the vehicle acquired by the front LiDAR 6f may be divided into three ranges of a right acquired image range W6, a middle acquired image range W7, and a left acquired image range W8, and the corresponding specific area of the windshield portion 136f may be divided into three areas of a right corresponding specific area Mc, a middle corresponding specific area Md, and a left corresponding specific area Me.

For example, when the vehicle 1 is travelling in a middle lane (central travelling lane) on a road having three lanes in each direction, it is assumed that a preceding vehicle 300 is present in front of the central travelling lane in which the vehicle 1 is travelling. The cleaner control unit 113 specifies that the preceding vehicle 300 is present in the middle acquired image range W7 among the right acquired image range W6, the middle acquired image range W7, and the left acquired image range W8, which are divided into three areas in front of the vehicle acquired by the front LiDAR 6f.

The cleaner control unit 113 specifies a corresponding specific area of the windshield portion 136f of the front LiDAR 6f corresponding to the middle acquired image range W7 in which the preceding vehicle 300 is specified to be present. As described above, the windshield portion 136f is divided into three areas of the right corresponding specific area Mc, the middle corresponding specific area Md, and the left corresponding specific area Me in the left-right direction of the front LiDAR 6f. The cleaner control unit 113 specifies the middle corresponding specific area Md as the corresponding specific area corresponding to the middle acquired image range W7. Then, as illustrated in FIG. 9, the cleaner control unit 113 controls the movable range of the nozzle 123 such that the high-pressure air is jetted only toward the middle corresponding specific area Md of the windshield portion 136f. As described above, by finely changing the movable range of the nozzle 123, the cleaning efficiency is further improved.

In the travelling state illustrated in FIG. 9 in which it is determined that the preceding vehicle 300 is present in the middle acquired image range W7, for example, it is assumed that the cleaner control unit 113 determines that a new stopped vehicle is present in front of the left travelling lane, that is, in the left acquired image range W8 together with the presence of the preceding vehicle 300. In this case, the cleaner control unit 113 may control the movable range of the nozzle 123 such that high-pressure air is also jetted to the left corresponding specific area Me corresponding to the left acquired image range W8 in addition to the middle corresponding specific area Md of the windshield portion 136f.

For example, it is assumed that the cleaner control unit 113 determines that there is a new preceding vehicle in front of the right travelling lane, that is, in the right acquired image range W6 together with the preceding vehicle 300 in the middle acquired image range W7 and the stopped vehicle in the left acquired image range W8. In this case, the cleaner control unit 113 may switch the movable range of the nozzle 123 so as to clean the front LiDAR 6f in the normal mode illustrated in FIG. 4 so that the high-pressure air is jetted also toward the right corresponding specific area Mc of the windshield portion 136f corresponding to the right acquired image range W6.

For example, it is assumed that a pedestrian (object) is present in a left area of a road when the vehicle 1 is travelling on the road of one lane in each direction. The cleaner control unit 113 specifies the presence of the pedestrian in the left acquired image range W8 of the right acquired image range W6, the middle acquired image range W7, and the left acquired image range W8 acquired by the front LiDAR 6f, and specifies the left corresponding specific area Me of the windshield portion 136f as the corresponding specific area corresponding to the left acquired image range W8 in which the pedestrian is specified to be present. Then, the cleaner control unit 113 may control the movable range of the nozzle 123 such that the high-pressure air is jetted only toward the left corresponding specific area Me of the windshield portion 136f.

For example, when the object is present across both the right acquired image range W6 and the middle acquired image range W7 among the acquired image ranges W6 to W8, the cleaner control unit 113 may control the movable range of the nozzle 123 such that the high-pressure air is jetted toward the right corresponding specific area Mc and the middle corresponding specific area Md of the windshield portion 136f corresponding to the right acquired image range W6 and the middle acquired image range W7.

Third Modification

In the second embodiment, an object around the vehicle 1 is detected, and the movement of the nozzle 123 is controlled such that a specific area of the windshield portion 136f corresponding to the object is cleaned in the predetermined mode different from the normal mode, but the present disclosure is not limited thereto. For example, the adhesion of rain or dirt to the windshield portion 136f of the front LiDAR 6f may be detected, and the windshield portion 136f may be cleaned in the predetermined mode different from the normal mode according to the adhesion degree of dirt.

Figure 10:
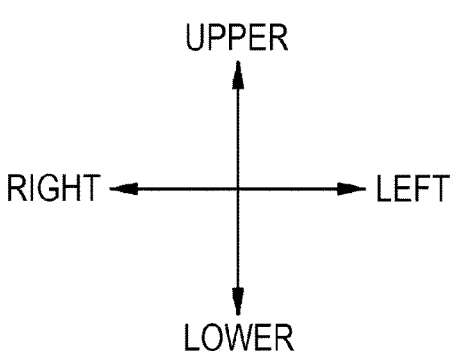
FIG. 10 is a diagram illustrating an operation control of a nozzle according to a third modification.
Figure 10:
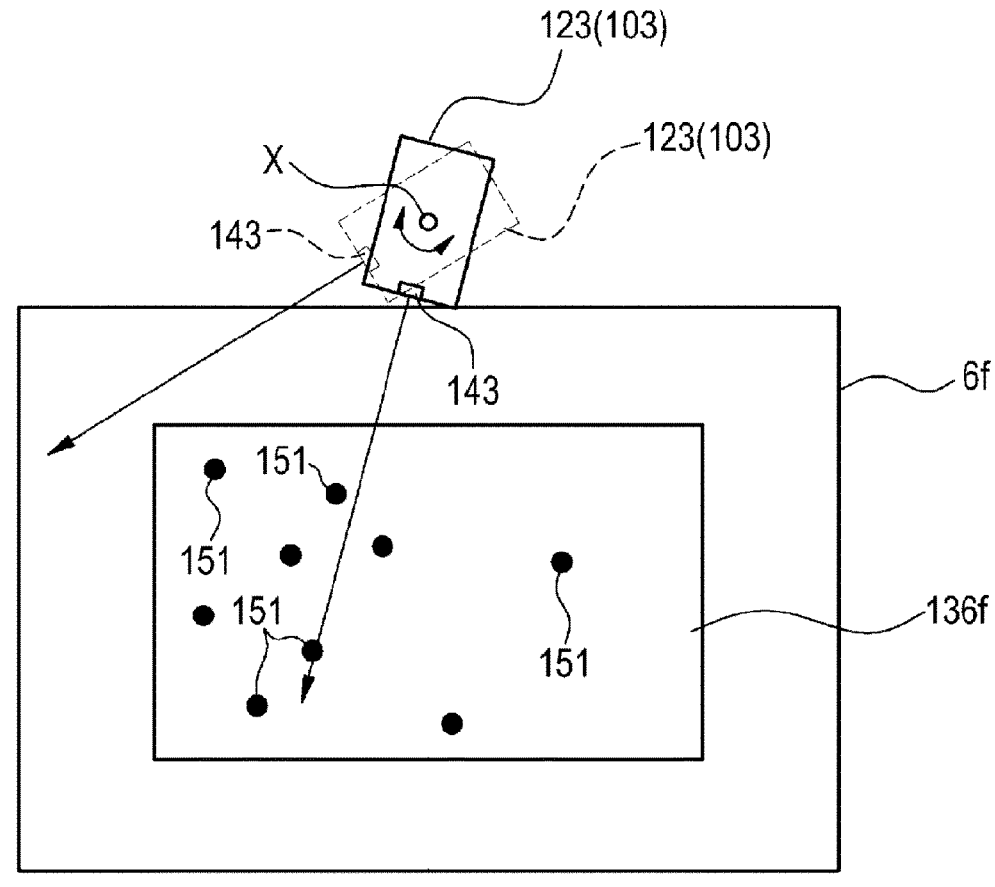

FIG. 10 is a diagram illustrating an example of a movable range of the nozzle 123 according to a third modification. In the second embodiment, the sensor control unit 114 that controls the front LiDAR 6f detects rain or dirt adhering to the windshield portion 136f from information acquired from the emitted light and the returned light of the front LiDAR 6f, and outputs a dirt detection signal. The dirt detection signal includes information on an adhesion degree of dirt indicating which area of the windshield portion 136f has a large amount of rain or dirt adhered. The adhesion degree of dirt is detected to be high in an area where a lot of rain or dirt is adhered, and the adhesion degree of dirt is detected to be low in an area where little rain or dirt is adhered.

In the example illustrated in FIG. 10, a larger amount of dirt 151 adheres to a right area of the windshield portion 136f than to a left area. In accordance with this, the sensor control unit 114 outputs the dirt detection signal including information indicating that the adhesion degree of dirt in the right area of the windshield portion 136*f* is high, and transmits the dirt detection signal to the cleaner control unit 113. The cleaner control unit 113 controls the movable range of the nozzle 123 of the front SC 103 based on the dirt detection signal received from the sensor control unit 114. Specifically, the cleaner control unit 113 controls the movable range of the nozzle 123 so as to jet the high-pressure air from the jetting port 143 toward the right area of the windshield portion 136*f* as illustrated in FIG. 8, based on the information indicating that the adhesion degree of dirt in the right area included in the dirt detection signal is high.

As described above, in the third modification, the cleaner control unit 113 is configured to switch the movable range of the nozzle 123 between the normal mode and the predetermined mode according to the adhesion degree of rain or dirt adhering to the windshield portion 136*f* of the front LiDAR 6*f*. As in the second embodiment, the mode may be switched by combining two or more requirements of the movable range of the nozzle 123, the operation speed of the nozzle 123, the jetting speed of the high-pressure air, and the jetting amount of the high-pressure air.

In the third modification, the sensor control unit 114 is configured to detect rain or dirt adhering to the windshield portion 136*f* based on the information acquired from the emitted light and the returned light of the front LiDAR 6*f*, but the present disclosure is not limited thereto. For example, rain or dirt adhering to the windshield portion 136*f* may be detected by a dirt sensor different from the front LiDAR 6*f* mounted on the vehicle 1.

Fourth Modification

Figure 11:
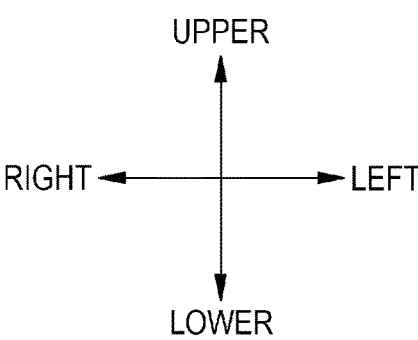
FIG. 11 is a diagram illustrating a configuration of a nozzle of a cleaner according to a fourth modification.
Figure 11:
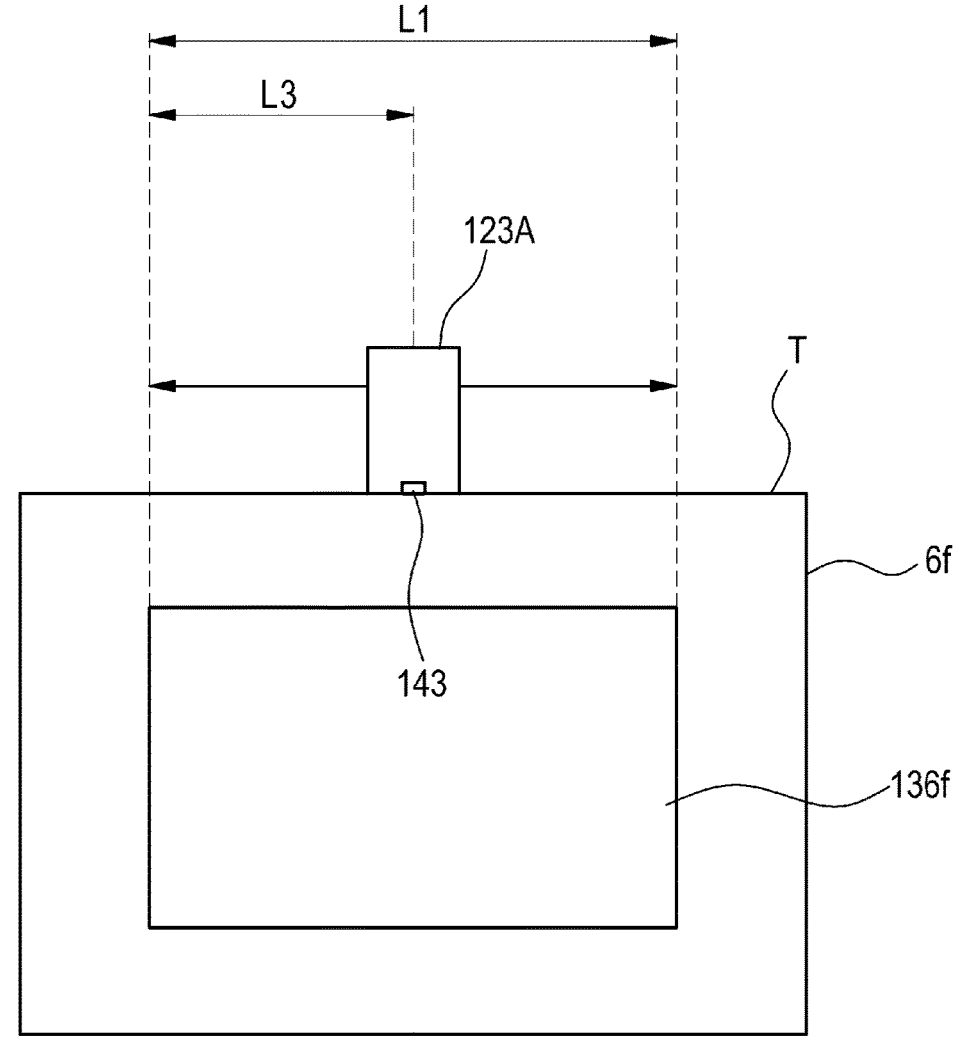

In the second embodiment, the second modification, and the third modification described above, the case has been described in which the movable range of the nozzle 123 changes according to the rotation amount (the magnitude of the swinging angle) of the nozzle 123 rotating about the rotation axis X, but the present disclosure is not limited thereto. FIG. 11 is a diagram illustrating a configuration of the nozzle 123A according to a fourth modification. In the fourth modification, for example, as illustrated in FIG. 11, the movable range of the nozzle 123A may be changed according to the slide amount of the nozzle 123A that slidingly moves in the left-right direction along the upper side T of the front LiDAR 6*f*.

When the front LiDAR 6*f* is cleaned in the normal mode, the movable range L1 by a sliding movement of the nozzle 123A is controlled to a range in which the high-pressure air jetted from the jetting port 143 is jetted from the left end area to the right end area of the windshield portion 136*f*. In contrast, when the front LiDAR 6*f* is cleaned in the predetermined mode, the movable range by the sliding movement of the nozzle 123A is controlled to a range (for example, a movable range L3 illustrated in FIG. 11) in which the high-pressure air jetted from the jetting port 143 is jetted only toward the corresponding specific area of the front LiDAR 6*f* corresponding to the position of the object of the vehicle 1. As described above, even when the movable range of the nozzle 123A is changed by slidingly moving the nozzle 123A according to the surrounding environment of the vehicle 1, a desired sensing range of the front LiDAR 6*f* may be intensively cleaned, and the detection accuracy of the front LiDAR 6*f* may be maintained by omitting unnecessary cleaning.

In the second embodiment, the cleaner that cleans the in-vehicle sensor mounted on the vehicle 1 has been described, but the present disclosure is not limited thereto. The cleaner according to the present disclosure may be used as a cleaner for cleaning a monitoring camera, a LiDAR, or the like provided in an infrastructure such as a road or a railway. Even when such a sensor system for infrastructure equipment is used, it is possible to effectively clean the sensor and maintain the detection accuracy of the sensor according to the surrounding environment, by controlling the movement of the nozzle and the like according to the position of the surrounding object.

Third Embodiment

Figure 12:
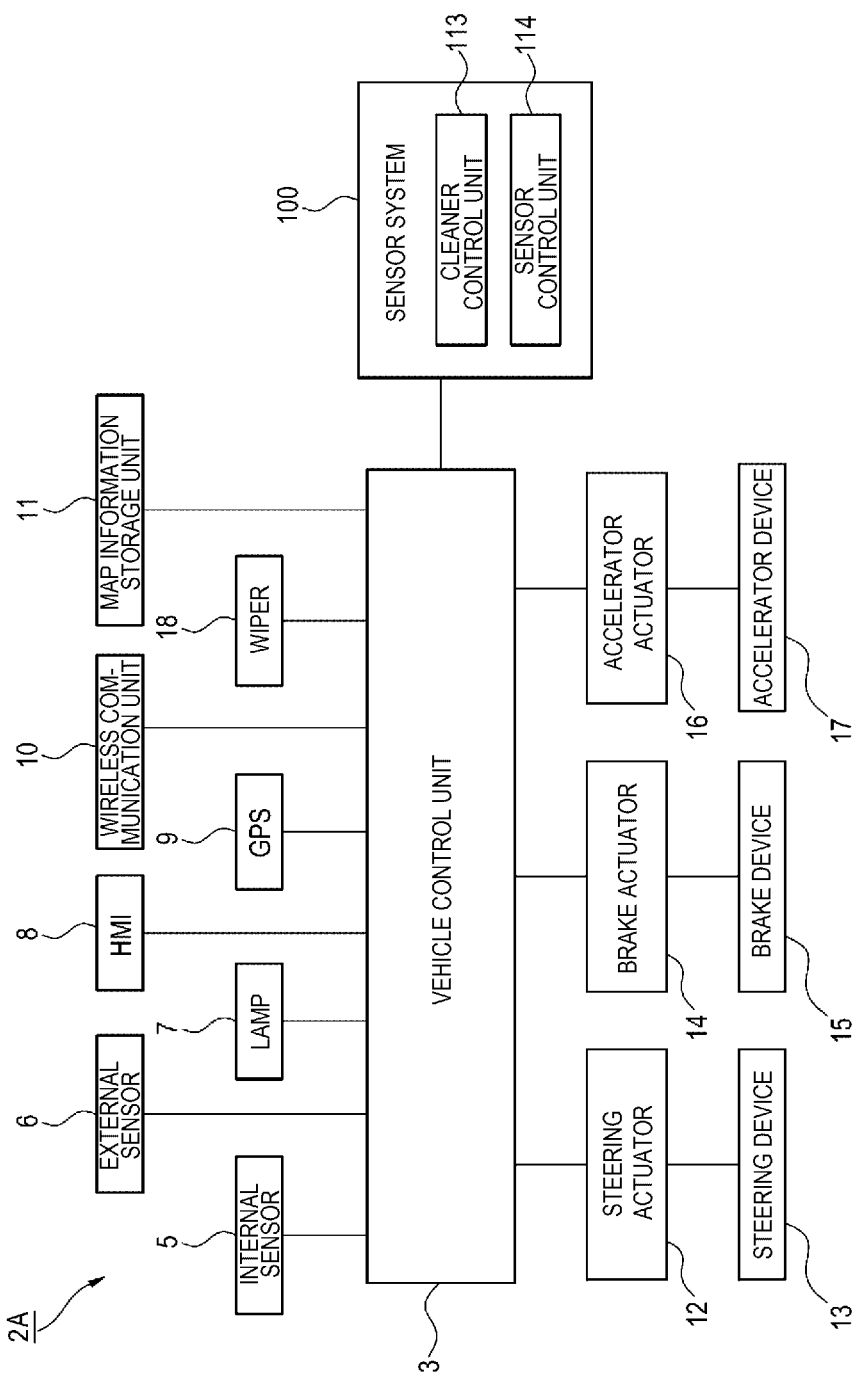
FIG. 12 is a block diagram of a vehicle system according to a third embodiment in which the sensor system of FIG. 1 is incorporated.

FIG. 12 is a block diagram of a vehicle system 2A according to a third embodiment in which the sensor system 100 is incorporated. As illustrated in FIG. 12, the vehicle system 2A includes a wiper 18 in addition to the vehicle control unit 3, the internal sensor 5, the external sensor 6, the lamp 7, the HMI 8, the GPS 9, the wireless communication unit 10, and the map information storage unit 11. The vehicle system 2A further includes the steering actuator 12, the steering device 13, the brake actuator 14, the brake device 15, the accelerator actuator 16, and the accelerator device 17. The sensor system 100 including the cleaner control unit 113 and the sensor control unit 114 is communicably connected to the vehicle control unit 3 of the vehicle system 2A.

The wiper 18 is, for example, a device that wipes raindrops on a front window or the like, and starts operating when an operation start signal is input from the outside. The wiper 18 can change the operation speed in a plurality of stages. The wiper 18 is configured to output a wiper operation signal to the vehicle control unit 3 and the cleaner control unit 113 in accordance with the operation.

Third Operation Control Example

Next, a third operation control example of the cleaners 101 to 108 in the cleaner system 110 having the above-described configuration will be described with reference to FIG. 4. FIG. 4 is a diagram illustrating a third operation control example of the nozzles of the cleaners 101 to 108 that clean the external sensor 6. In the third embodiment, as in the first embodiment and the second embodiment, among the nozzles of the cleaners 101 to 108, the nozzle 123 of the front SC 103 for cleaning the front LiDAR 6*f* provided at the front portion of the vehicle 1 will be described. Note that the nozzles other than the nozzle of the front SC 103 perform the same operation, and therefore description thereof is omitted. In FIG. 4, the range W1 indicated in front of the vehicle 1 represents a sensing range in which the front LiDAR 6*f* can be detected.

For example, when a wiper switch is turned on by the driver of the vehicle 1, the wiper 18 (an example of an external element) starts operating, and the wiper operation signal is output from the wiper 18 or the vehicle control unit 3. The wiper operation signal output from the wiper 18 or the vehicle control unit 3 is input to the cleaner control unit 113. The cleaner control unit 113 acquires weather information from the input wiper operation signal. The weather information includes, for example, information on the operation speed of the wiper 18. The wiper 18 is generally operated under bad weather such as rain or snow. In accordance with this, the cleaner control unit 113 determines that there is a possibility that the detection capability of the front LiDAR 6*f* decreases due to the foreign matter that may adhere to the windshield portion 136*f* of the front LiDAR 6*f* under bad weather, when the wiper operation signal is input from the wiper 18. The cleaner control unit 113 determines that it is heavy rain, heavy snow, or a blizzard when the operation speed of the wiper 18 is equal to or higher than a threshold, and determines that it is light rain or light snow when the operation speed is lower than the threshold. When the operation speed of the wiper 18 is equal to or higher than the threshold, the cleaner control unit 113 controls the operation speed of the nozzle 123 of the front SC 103 to be higher than when the operation speed of the wiper 18 is lower than the threshold, that is, controls the swinging speed of the nozzle 123 rotating around the rotation axis X to increase.

Fourth Operation Control Example

In a fourth operation control example, a configuration will be described in which the operation of the nozzle 123 is controlled based on detection of raindrops by the raindrop sensor.

For example, when a raindrop is detected by the raindrop sensor (an example of the external element) mounted on the vehicle 1, a raindrop detection signal is output from the raindrop sensor. The raindrop detection signal output from the raindrop sensor is input to the cleaner control unit 113. The cleaner control unit 113 acquires the weather information from the input raindrop detection signal. The weather information includes information related to the amount of raindrops detected by the raindrop sensor. When the amount of raindrops detected by the raindrop sensor is equal to or larger than a threshold, that is, when the amount of raindrops is large, the cleaner control unit 113 determines that it is heavy rain, and when the amount of raindrops is less than the threshold, the cleaner control unit 113 determines that it is light rain. When the amount of raindrops detected by the raindrop sensor is equal to or larger than the threshold, the cleaner control unit 113 controls the operation speed of the nozzle 123 of the front SC 103 to be higher than that when the amount of raindrops is less than the threshold, that is, controls the swinging speed of the nozzle 123 rotating around the rotation axis X to increase.

Fifth Operation Control Example

In a fifth operation control example, a configuration will be described in which the operation of the nozzle 123 is controlled based on the weather information.

For example, when the current weather around the vehicle 1 is detected by a weather sensor (an example of the external element) mounted on the vehicle 1 or by the road-to-vehicle communication with infrastructure equipment (an example of the external element) by the wireless communication unit 10, a weather detection signal is output from the weather sensor and the wireless communication unit 10. The weather detection signal output from the weather sensor or the wireless communication unit 10 is input to the cleaner control unit 113. The cleaner control unit 113 acquires the weather information from the input weather detection signal. The weather information includes information on the current weather around the vehicle 1, for example, information such as sunny, cloudy, rainy, and snowy. When the current weather around the vehicle 1 detected by the weather sensor and the wireless communication unit 10 is rainy or snowy, the cleaner control unit 113 controls the operation speed of the nozzle 123 of the front SC 103 to be higher than that in the case of sunny or cloudy, that is, controls the swinging speed of the nozzle 123 rotating around the rotation axis X to increase.

Sixth Operation Control Example

In a sixth operation control example, a configuration will be described in which the operation of the nozzle 123 is controlled based on the outside air temperature.

For example, when an outside air temperature around the vehicle 1 is detected by the temperature sensor (an example of the external element) mounted on the vehicle 1, an outside air temperature detection signal is output from the temperature sensor. The outside air temperature detection signal output from the temperature sensor is input to the cleaner control unit 113. The cleaner control unit 113 acquires the weather information from the input outside air temperature detection signal. The weather information includes information on the current air temperature around the vehicle 1. The cleaner control unit 113 determines that snow or sleet dirt is likely to adhere to the windshield portion 136*f* of the front LiDAR 6*f* when the outside air temperature around the vehicle 1 detected by the temperature sensor is a low temperature equal to or lower than a threshold, and determines that it is rainy and snow and sleet dirt is relatively less likely to adhere to the windshield portion 136*f* when the outside air temperature is higher than the threshold. When the outside air temperature detected by the temperature sensor is equal to or lower than the threshold, the cleaner control unit 113 controls the operation speed of the nozzle 123 of the front SC 103 to be higher than when the outside air temperature is higher than the threshold, that is, controls the swinging speed of the nozzle 123 rotating around the rotation axis X to increase.

Seventh Operation Control Example

In a seventh operation control example, a configuration will be described in which the operation of the nozzle 123 is controlled based on a humidity.

For example, when the humidity around the vehicle 1 is detected by a humidity sensor (an example of the external element) mounted on the vehicle 1, a humidity detection signal is output from the humidity sensor. The humidity detection signal output from the humidity sensor is input to the cleaner control unit 113. The cleaner control unit 113 acquires the weather information from the input humidity detection signal. The weather information includes information on the current humidity around the vehicle 1. The cleaner control unit 113 determines that the dirt is likely to adhere to the windshield portion 136*f* of the front LiDAR 6*f* when the humidity around the vehicle 1 detected by the humidity sensor is a high humidity equal to or higher than a threshold, and determines that the dirt is relatively less likely to adhere to the windshield portion 136*f* of the front LiDAR 6*f* when the humidity is lower than the threshold than when the humidity is high. When the humidity detected by the humidity sensor is equal to or higher than the threshold, the cleaner control unit 113 controls the operation speed of the nozzle 123 of the front SC 103 to be higher than when the humidity is lower than the threshold, that is, controls the swinging speed of the nozzle 123 rotating around the rotation axis X to increase.

As described above, the cleaner system 110 according to the third present embodiment includes the front SC 103 (the example of the cleaner) including the nozzle 123 having the jetting port 143 that jets the high-pressure air to the windshield portion 136*f* that is a surface to be cleaned of the front LiDAR 6*f* (the example of the sensor) mounted on the vehicle 1, and the cleaner control unit 113 (the example of the control unit) that controls the operation of the front SC 103. The nozzle 123 is configured to be rotatable around the rotation axis X in the operation state of the front SC 103. The cleaner control unit 113 is configured to acquire the weather information from an external element different from the front LiDAR 6*f* and the front SC 103 and change an operation mode (for example, the operation speed) of the nozzle 123 according to the weather information. According to this configuration, by controlling the operation mode of the nozzle 123 according to the weather condition when the vehicle is travelling, it is possible to effectively clean the front LiDAR 6*f* and maintain the detection accuracy of the front LiDAR 6*f*.

In the present embodiment, the external element may be the wiper 18 mounted on the vehicle 1, and the cleaner control unit 113 may be configured to increase the operation speed of the nozzle 123 when the operation speed of the wiper 18 is equal to or higher than the threshold, compared to when the operation speed is lower than the threshold. In rainy weather, rain or dirt is likely to adhere to the front LiDAR 6*f*, and thus the detection accuracy of the front LiDAR 6*f* may decrease. By determining whether it is rainy based on the operation speed of the wiper 18 and moving the nozzle 123 at a high speed when it is rainy, it is possible to effectively clean the front LiDAR 6*f* in a situation where rain or dirt is likely to adhere to the front LiDAR 6*f*.

In the present embodiment, the external element may be the raindrop sensor mounted on the vehicle 1, and the cleaner control unit 113 may be configured to increase the operation speed of the nozzle 123 when the amount of raindrops detected by the raindrop sensor is equal to or larger than the threshold, compared to when the amount of raindrops is less than the threshold. By determining whether it is rainy based on the amount of raindrops by the raindrop sensor and moving the nozzle 123 at a high speed when it is rainy, it is possible to effectively clean the front LiDAR 6*f* in a situation where rain or dirt is likely to adhere to the front LiDAR 6*f*.

In the present embodiment, the weather information is information provided from the outside of the vehicle 1, and may include any one of weather, the outside air temperature, and the humidity, for example. By changing the operation speed of the nozzle 123 based on the weather information acquired from the outside, it is possible to effectively clean the front LiDAR 6*f* in a situation where rain or dirt is likely to adhere to the front LiDAR 6*f*.

In the present embodiment, the cleaner control unit 113 may be configured to increase the operation speed of the nozzle 123 when the weather is rainy or snowy, compared to when the weather is sunny or cloudy. By moving the nozzle 123 at a higher speed during rainy weather than during sunny weather or cloudy weather, it is possible to effectively clean rain or dirt adhering to the front LiDAR 6*f*.

In the present embodiment, the cleaner control unit 113 may increase the operation speed of the nozzle 123 when the outside air temperature is equal to or lower than the threshold, compared to when the outside air temperature is higher than the threshold. The cleaner control unit 113 may increase the operation speed of the nozzle 123 when the humidity is equal to or higher than the threshold, compared to when the humidity is lower than the threshold. Even when the outside air temperature is low or the humidity is high, rain or dirt is likely to adhere to the front LiDAR 6*f*, and thus the detection accuracy of the front LiDAR 6*f* may decrease. Even in this case, by moving the nozzle 123 at a high speed, it is possible to effectively clean rain or dirt adhering to the front LiDAR 6*f*.

In the present embodiment, the external element may be the dirt sensor (an example of a dirt detection unit) capable of detecting the adhesion degree of rain or dirt adhering to the windshield portion 136*f* which is the surface to be cleaned, and the cleaner control unit 113 may be configured to change the movable range of the nozzle 123 according to the adhesion degree of dirt detected by the dirt sensor. For example, by changing the movable range of the nozzle 123 so as to intensively clean an area of the windshield portion 136*f* where the adhesion degree of dirt or rain is high, it is possible to satisfactorily maintain the detection accuracy of the front LiDAR 6*f* while omitting unnecessary cleaning.

Fifth Modification

Figure 13:
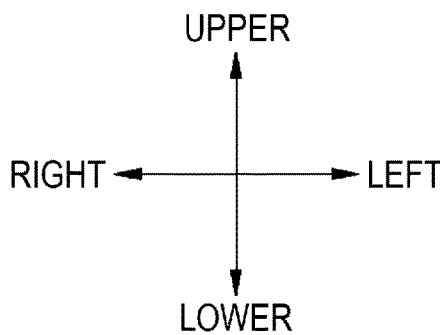
FIG. 13 is a diagram illustrating a movable range of a nozzle according to a fifth modification.
Figure 13:
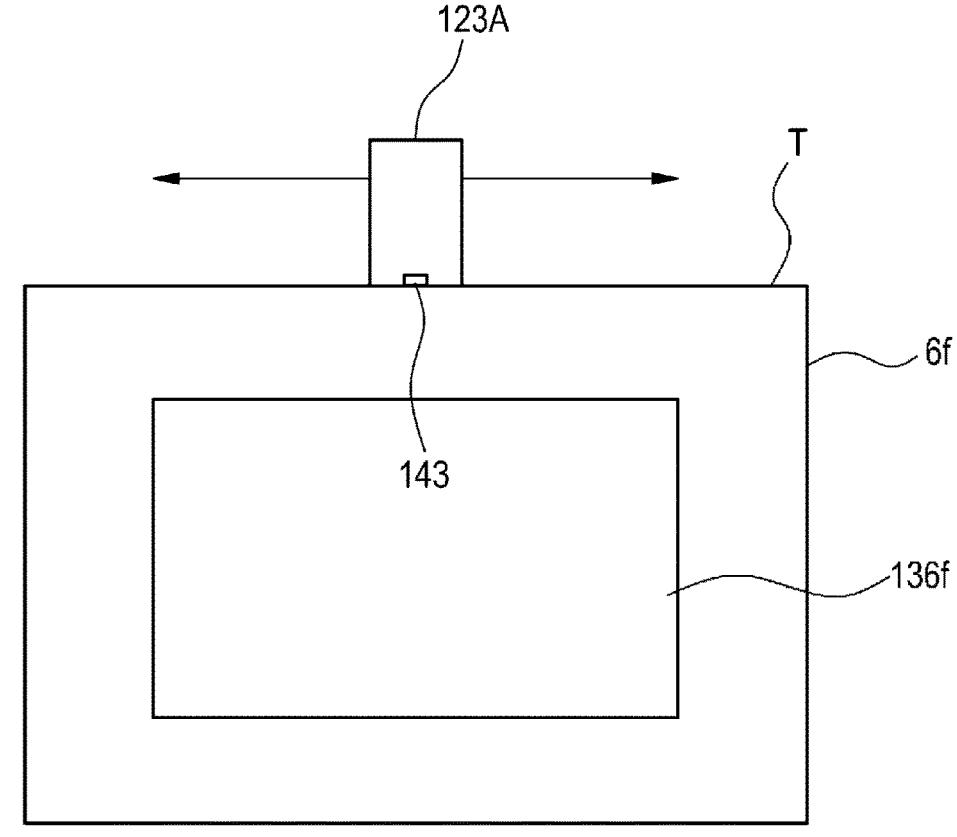

In the above embodiment, the case has been described in which the nozzle 123 rotates about the rotation axis X (swings the head thereof in the left-right direction), but the present disclosure is not limited thereto. FIG. 13 is a diagram illustrating a configuration of the nozzle 123A according to a fifth modification. For example, as illustrated in FIG. 13, the nozzle 123A may slidingly move in the left-right direction along the upper side T of the front LiDAR 6*f*. The cleaner control unit 113 may perform a control so as to change the speed of the sliding movement or the movable range of the sliding movement of the nozzle 123A according to weather information acquired from the external element. As described above, even when the nozzle 123A is slidingly moved according to the weather condition when the vehicle is travelling, and a slide speed or the movable range of the nozzle 123A is changed, it is possible to effectively clean the front LiDAR 6*f* and maintain the detection accuracy of the front LiDAR 6*f*.

Although the embodiments of the present disclosure have been described above, it is needless to say that the technical scope of the present disclosure should not be limited to the description of the embodiments. The present embodiment is merely an example, and it is understood by those skilled in the art that various modifications of the embodiment are possible within the scope of the disclosure described in the claims. The technical scope of the present disclosure should be determined based on the scope of the disclosure described in the claims and its equivalents.

In the above embodiments, the configuration has been described in which the front WW 101, the rear WW 102, the right HC 107, and the left HC 108 jet the cleaning liquid, while the front SC 103, the rear SC 104, the right SC 105, and the left SC 106 jet the high-pressure air, but the present disclosure is not limited thereto. In each cleaner, whether to use the cleaning liquid or the high-pressure air as the cleaning medium can be appropriately changed according to the type of a target to be cleaned and the desired cleanliness.

In the above embodiments, the example has been described in which the sensor system 100 is mounted on the vehicle capable of autonomous driving, but the sensor system 100 may be mounted on a vehicle that is not capable of autonomous driving.

In the above embodiments, the vehicle control unit 3, the cleaner control unit 113, and the sensor control unit 114 are separately provided, but the present disclosure is not limited thereto. For example, the vehicle control unit 3 and the sensor control unit 114 may be integrally configured, the vehicle control unit 3 and the cleaner control unit 113 may be integrally configured, or the vehicle control unit 3, the cleaner control unit 113, and the sensor control unit 114 may be integrally configured.

The present application is based on Japanese Patent Application No. 2021-171529 filed on Oct. 20, 2021, Japanese Patent Application No. 2021-171530 filed on Oct. 20, 2021, and Japanese Patent Application No. 2021-171532 filed on Oct. 20, 2021, and the contents thereof are incorporated herein by reference.

The invention claimed is:

1. A cleaner system comprising:

a cleaner including a nozzle having a jetting port for jetting a cleaning medium to a surface to be cleaned of a sensor mounted on a vehicle; and a control unit configured to control an operation of the cleaner, wherein the nozzle is rotatable or slidingly movable in an operation state of the cleaner, and the control unit is configured to change a movable range of the nozzle according to a travelling condition of the vehicle.

2. The cleaner system according to claim 1, wherein the travelling condition includes at least one of a vehicle speed of the vehicle and a road condition on which the vehicle is travelling.

3. The cleaner system according to claim 2, wherein the control unit controls the nozzle such that a second movable range, which is the movable range when the vehicle speed is higher than a first threshold speed or the vehicle is travelling on a highway, is narrower than a first movable range, which is the movable range when the vehicle speed is equal to or lower than the first threshold speed or the vehicle is travelling on a general road.

4. The cleaner system according to claim 3, wherein the second movable range includes at least a central area of the first movable range.

5. The cleaner system according to claim 3, wherein the control unit sets a second threshold speed lower than the first threshold speed, and controls the nozzle such that a third movable range, which is the movable range when the vehicle speed is equal to or higher than the second threshold speed and equal to or lower than the first threshold speed, is narrower than the first movable range and wider than the second movable range.

6. A cleaner system comprising:

a cleaner including a nozzle having a jetting port for jetting a cleaning medium to a surface to be cleaned of a sensor capable of detecting an object; and a control unit configured to control an operation of the cleaner, wherein the nozzle is rotatable or slidingly movable in an operation state of the cleaner, and the control unit controls a movement of the nozzle so as to clean an area corresponding to the object on the surface to be cleaned in a predetermined mode different from a normal mode, wherein the predetermined mode includes causing a movable range of the nozzle to be different from the normal mode, wherein the surface to be cleaned includes a plurality of areas, and wherein the control unit changes the movable range so as to jet the cleaning medium toward only an area corresponding to a position of the object among the plurality of areas.

7. The cleaner system according to claim 6, wherein the predetermined mode includes causing at least one of an operation speed of the nozzle, a jetting speed of the cleaning medium, and a jetting amount of the cleaning medium to be different from the normal mode.

8. The cleaner system according to claim 7, wherein the control unit is configured to make the operation speed or the jetting speed for the area corresponding to the position of the object among the plurality of areas higher or lower than the operation speed or the jetting speed for an area not corresponding to the position of the object.

9. The cleaner system according to claim 7, wherein the control unit is configured to make the jetting amount for the area corresponding to the position of the object among the plurality of areas larger than the jetting amount for an area not corresponding to the position of the object.

10. The cleaner system according to claim 6, wherein the plurality of areas are constituted by two or three areas divided in a left-right direction of the surface to be cleaned.

11. The cleaner system according to claim 6, wherein when it is determined that there is an object different from a specified object together with the specified object after the cleaning in the predetermined mode is started, the control unit switches from the predetermined mode to the cleaning in the normal mode.

12. The cleaner system according to claim 6, wherein the object includes rain or dirt adhering to the surface to be cleaned, and the control unit switches between the normal mode and the predetermined mode according to an adhesion degree of the rain or the dirt.

13. The cleaner system according to claim 6, wherein the sensor is an in-vehicle sensor mounted on a vehicle.

* * * * *